United States Patent [19]
Barrere, Jr.

[11] 3,733,775
[45] May 22, 1973

[54] ADSORPTION PROCESS FOR RECOVERING ADSORBABLE COMPONENTS FROM A MULTI-COMPONENT GAS STREAM

[75] Inventor: Clem A. Barrere, Jr., Houston, Tex.
[73] Assignee: Continental Oil Company, Ponca City, Okla.
[22] Filed: July 14, 1971
[21] Appl. No.: 162,462

[52] U.S. Cl. .................................... 55/28, 55/62
[51] Int. Cl. ............................... B01d 53/04
[58] Field of Search .................... 55/28, 62, 74, 75, 55/179, 208, 387, 389; 208/310

[56] References Cited

UNITED STATES PATENTS

| | | | |
|---|---|---|---|
| 3,395,097 | 7/1968 | Senn | 208/310 |
| 3,479,797 | 11/1969 | Spencer et al. | 55/62 |
| 3,355,860 | 12/1967 | Arnoldi | 55/75 |

Primary Examiner—Charles N. Hart
Attorney—Joseph C. Kotarski, Henry H. Hutch, Robert B. Coleman, Jr. and Gerald L. Floyd

[57] ABSTRACT

By the present invention a cyclic adsorption process is provided for recovering adsorbable components from a multi-component inlet gas stream. One or more of a plurality of fixed beds of solid adsorbent are contacted with the inlet gas stream so that adsorbable components contained therein are adsorbed on the bed or beds. Simultaneously, one or more other of the bed or beds are contacted with a heated regeneration gas stream so that previously adsorbed components which are easy to regenerate are desorbed therefrom into said regeneration gas stream and recovered and one or more additional beds are contacted with a cooling gas stream so that the bed or beds are cooled. The flow patterns of the inlet gas stream, the regeneration gas stream and the cooling gas stream are continuously changed or cycled so that the bed or beds just contacted with the inlet gas stream are contacted with the heated regeneration gas stream thereby desorbing easy-to-regenerate components therefrom, the bed or beds just contacted with the cooling gas stream are contacted with the inlet gas stream and the bed or beds just contacted with the heated regeneration gas stream are contacted with the cooling gas stream. Each of the beds is periodically contacted with a second heated regeneration gas stream so that previously adsorbed components which are difficult to regenerate are desorbed into the second regeneration gas stream and recovered thereby preventing the buildup of difficult-to-regenerate components on the beds.

21 Claims, 9 Drawing Figures

INVENTOR
CLEM A. BARRERE, JR.

ATTORNEY

INVENTOR
CLEM A. BARRERE JR.

BY Gerald L. Floyd
ATTORNEY

INVENTOR
CLEM A. BARRERE, JR.

BY Gerald L. Floyd
ATTORNEY

INVENTOR
CLEM A. BARRERE, JR.
BY
ATTORNEY

INVENTOR
CLEM A. BARRERE, JR.
BY Gerald L. Floyd
ATTORNEY

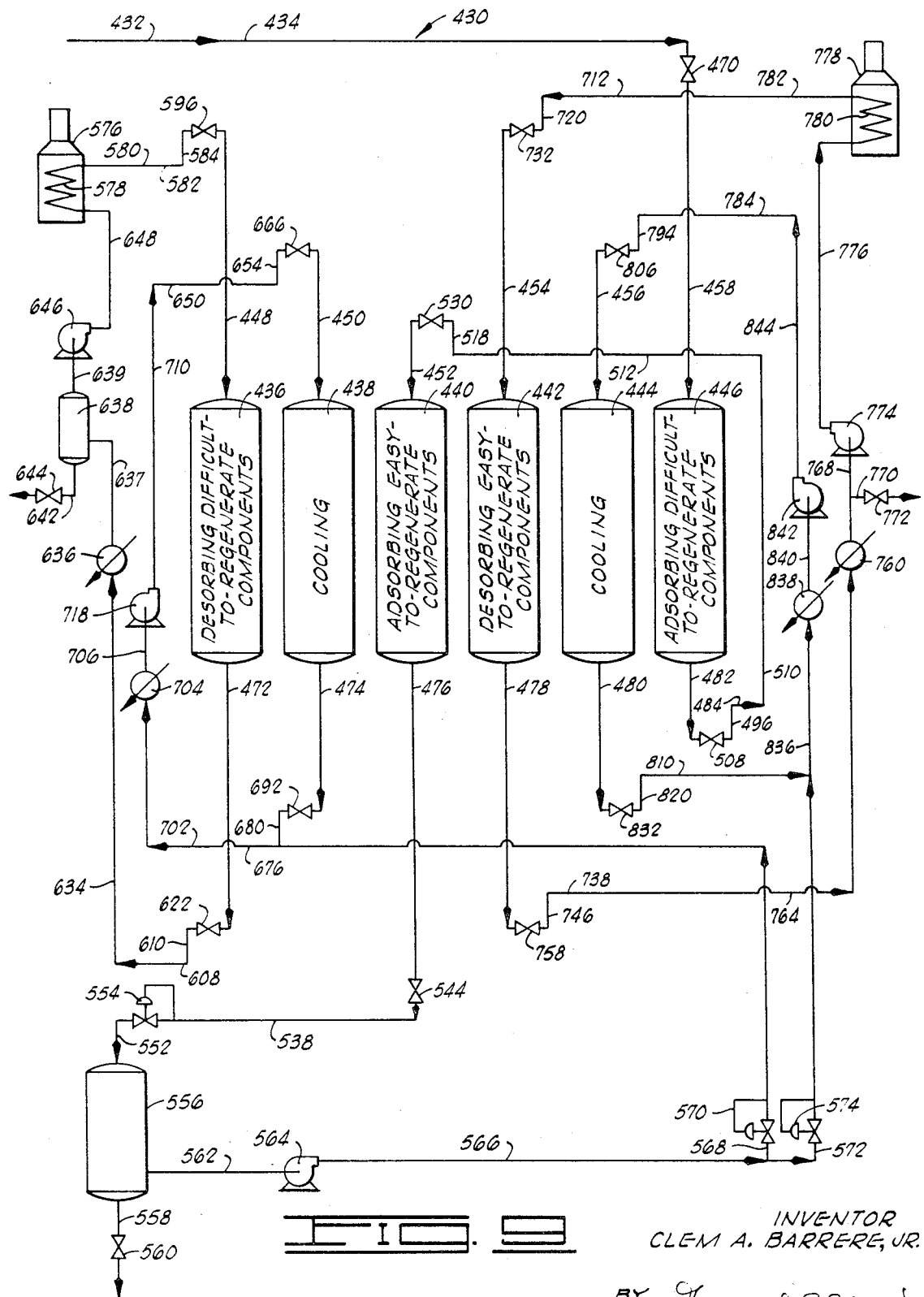

ADSORPTION PROCESS FOR RECOVERING ADSORBABLE COMPONENTS FROM A MULTI-COMPONENT GAS STREAM

BACKGROUND OF THE INVENTION

1. Field of the Invention

The present invention relates generally to an adsorption process for recovering adsorbable components from a multi-component gas stream, and more particularly, but not by way of limitation, to a cyclic adsorption process for efficiently recovering both difficult and easy-to-regenerate components from a gas stream, which process utilizes a plurality of fixed beds of solid adsorbent.

2. Description of the Prior Art

Many continuous cyclic vapor adsorption processes for recovering desired components from a gas stream have been developed which utilize a plurality of fixed beds of solid adsorbent. Generally, one or more of the beds are utilized for adsorbing adsorbable components from the gas stream while the other beds are being regenerated. That is, the beds are successively contacted with the inlet gas stream so that adsorbable components contained therein are adsorbed by the adsorbent. During the time that one or more of the beds are being contacted with the inlet gas stream, the other beds are regenerated by contact with a heated regeneration gas stream which causes previously adsorbed components to be desorbed therefrom followed by contact with a cooling gas stream so that the beds are cooled preparatory to again contacting the inlet gas stream. The flow patterns of the various gas streams are continuously changed or cycled so that the bed or beds which have just contacted the inlet gas stream are contacted with the heated regeneration gas stream, the bed or beds which have just been contacted with the heated regeneration gas stream are contacted with the cooling gas stream, and the bed or beds which have just been contacted with the cooling gas stream are contacted with the inlet gas stream.

The term "adsorbable components" is used herein to mean those gas components which are capable of being adsorbed and regenerated or desorbed from a bed of solid adsorbent, both of the readily condensible and non-condensible types. For example, hydrocarbon compounds contained in natural gas streams are readily adsorbed by a variety of commercially available solid adsorbents, and may be desorbed therefrom. In addition, components such as ethane, ethylene, carbon dioxide, hydrogen sulfide, etc. commonly found in refinery gas streams may be adsorbed and desorbed from adsorbent materials.

Adsorption processes of the type described above are often utilized for adsorbing two or more adsorbable components from a multi-component gas stream. Commonly, one or more of the adsorbable components are difficult to regenerate as compared to the other components and the difficult-to-regenerate components are present in the gas stream in minor quantities as compared to the easy-to-regenerate components. For example, natural gas streams usually contain hydrocarbon compounds which are relatively easy to regenerate, such as methane, ethane, propane and butane, and hydrocarbon compounds which are relatively difficult to regenerate, such as pentanes and heavier hydrocarbon compounds with the easy-to-regenerate compounds making up the major portion of the gas streams. Refinery gas streams usually contain a major portion of hydrocarbon compounds which are relatively easy to regenerate, such as ethane and ethylene, and a minor portion of hydrocarbon compounds which are relatively difficult to regenerate, such as heavy olefin hydrocarbon compounds. As contrasted with easy-to-regenerate components, in order to regenerate a bed of adsorbent having difficult-to-regenerate components adsorbed thereon, the bed must be contacted with a heated regeneration gas stream at a relatively high temperature and flow rate and/or for a relatively long period of time.

In an adsorption process wherein a bed of adsorbent is contacted with a multi-component gas stream containing both difficult and easy-to-regenerate adsorbable components, all of the adsorbable components are adsorbed on the bed to some degree. The most difficult-to-regenerate components are adsorbed first followed by other adsorbable components in the order to their degree of difficulty to regenerate. For example, when an adsorbent such as activated carbon is contacted with a gas stream containing methane, ethane and propane, the propane is adsorbed first followed by the ethane, with the methane being adsorbed last. When the activated carbon is regenerated by contact with a heated regeneration gas stream, the adsorbed hydrocarbon compounds are desorbed in reverse order.

In applications where adsorption processes are utilized for recovering easy-to-regenerate components from multi-component gas streams, the presence of difficult-to-regenerate components in the gas streams caused serious problems. In order to adsorb a major portion of the easy-to-regenerate components in a gas stream, the cycle time, i.e., the time the gas stream is allowed to contact the adsorbent must be limited. This is because the difficult-to-regenerate components are adsorbed first, and with increasing contact time the quantity of difficult-to-regenerate components adsorbed increases, thereby reducing the capacity of the adsorbent for easy-to-regenerate components. Due to the limited cycle time, adequate regeneration of the adsorbent is difficult to achieve, and heretofore over a period of time, adsorbed difficult-to-regenerate components build up on the adsorbent reducing its capacity for easy-to-regenerate components and decreasing the effective life of the adsorbent.

By the present invention, an adsorption process for recovering adsorbable components from a multi-component gas stream is provided wherein each of the adsorbent beds is periodically subjected to extensive regeneration by contact with a heated regeneration gas stream at a relatively high temperature and flow rate, or for a long period of time, or both, thereby preventing the buildup of difficult-to-regenerate components on the beds and bringing about the recovery of a high percentage of the adsorbable components contained in the gas stream.

SUMMARY OF THE INVENTION

The present invention relates to an adsorption process for recovering adsorbable components from a multi-component inlet gas stream which comprises contacting one or more of a plurality of beds of solid adsorbent with the inlet gas stream so that adsorbable components contained therein are adsorbed on the bed or beds. One or more other of the beds are contacted with a heated regeneration gas stream so that previously adsorbed components which are easy to regenerate are desorbed therefrom into the regeneration gas stream, and the easy-to-regenerate components are recovered from the regeneration gas stream. One or more other of the beds are contacted with a cooling gas stream so that the beds are cooled preparatory to contacting the inlet gas stream. The flow patterns of the inlet gas stream, regeneration gas stream and cooling gas stream are continuously changed so that the bed or beds just contacted with the inlet gas stream are contacted with the heated regeneration gas stream thereby desorbing easy-to-regenerate components therefrom, the bed or beds just contacted with the cooling gas stream are contacted with the inlet gas stream and the bed or beds just contacted with the heated regeneration gas stream are contacted with the cooling gas stream. Each of the beds are periodically contacted with a second heated regeneration gas stream so that previously adsorbed components which are difficult to regenerate are desorbed therefrom into the second regeneration gas stream thereby preventing the buildup of difficult-to-regenerate components on the beds, and the difficult-to-regenerate components are recovered from the second regeneration gas stream.

It is, therefore, an object of the present invention to provide an adsorption process for recovering adsorbable components from a multi-component gas stream.

A further object of the present invention is the provision of an adsorption process wherein each of the adsorbent beds utilized is subjected to an extensive regeneration so that difficult-to-regenerate components are removed therefrom and the buildup of difficult-to-regenerate components on the beds is prevented.

Another object of the present invention is the provision of an adsorption process for recovering adsorbable components from a multi-component gas stream wherein a high percentage of the adsorbable components are recovered.

Other and further objects, features and advantages of the present invention will be apparent from the following description of presently preferred embodiments of the invention, given for the purpose of disclosure and taken in conjunction with the accompanying drawings.

DESCRIPTION OF THE DRAWINGS

FIG. 9 illustrates the gas stream flow patterns through the system of FIG. 7 during a fifth cycle.

DESCRIPTION OF THE PREFERRED EMBODIMENTS

Figure 1:
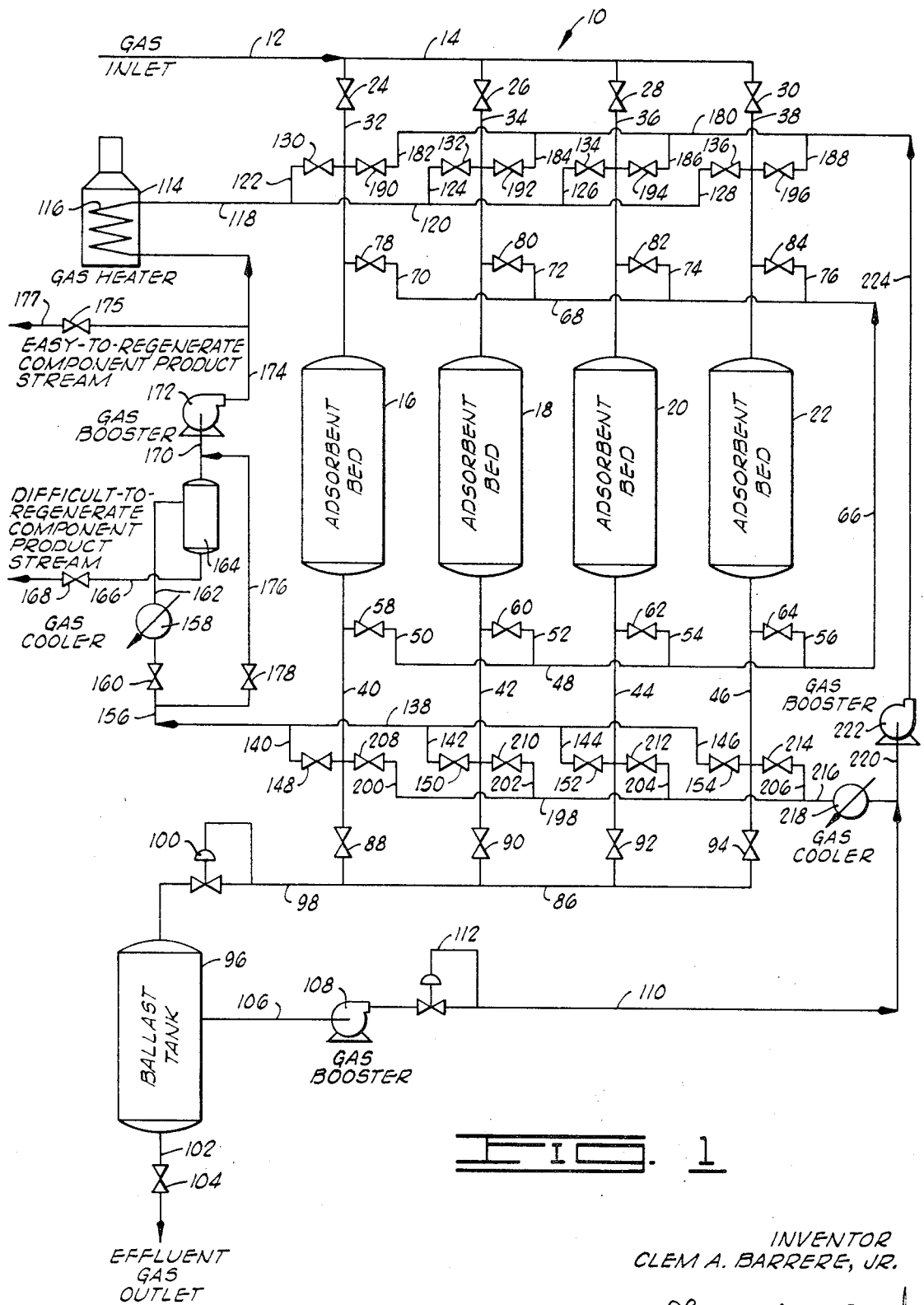
FIG. 1 illustrates a system which may be used for carrying out the process of the present invention in diagrammatic form.

Referring now to the drawings, and particularly to FIG. 1, a system 10 is illustrated for carrying out the adsorption process of the present invention. A multi-component inlet gas stream containing adsorbable components is conducted to the system 10 by way of an inlet conduit 12. The conduit 12 is connected to an inlet gas header 14 from where the inlet gas stream is selectively routed to one of four fixed adsorbent beds contained within vessels 16, 18, 20 and 22 by means of valves 24, 26, 28 and 30 disposed in conduits 32, 34, 36 and 38 respectively. The conduits 32, 34, 36 and 38 are connected to the header 14 and to inlet connections disposed in the vessels 16, 18, 20 and 22 respectively.

Conduits 40, 42, 44 and 46 are connected to outlet connections in the vessels 16, 18, 20 and 22 respectively, and a residue gas outlet header 48 is connected to the conduits 40, 42, 44 and 46 by conduits 50, 52, 54 and 56 respectively. Valves 58, 60, 62 and 64 are disposed in the conduits 50, 52, 54 and 56. The header 48 is connected by a conduit 66 to a residue gas inlet header 68. The residue gas inlet header 68 is connected to the conduits 32, 34, 36 and 38 by conduits 70, 72, 74 and 76 respectively. Valves 78, 80, 82 and 84 are disposed in the conduits 70, 72, 74 and 76.

An effluent gas outlet header 86 is provided connected to the conduits 40, 42, 44 and 46. Valves 88, 90, 92 and 94 are disposed in the conduits 40, 42, 44 and 46 respectively. The header 86 is connected to a ballast tank 96 by a conduit 98, and a conventional upstream pressure controller 100 is disposed in the conduit 98. The outlet connection of the ballast tank 96 is connected to a conduit 102 having a conventional check valve 104 disposed therein.

A conduit 106 is connected to the ballast tank 96 and to the suction connection of a conventional gas compressor or gas booster 108. The discharge connection of the gas booster 108 is connected to the conduit 110 having a conventional downstream pressure controller 112 disposed therein.

A closed regeneration gas stream circuit for continuously regenerating one of the adsorbent beds contained within the vessels 16, 18, 20 and 22 is provided. The term "closed circuit" is used herein to mean a system of conduits, valves, pumps, etc., within which a gas stream is continuously recirculated without the continuous addition or removal of gas therefrom. A conventional gas stream heater 114 is included in the regeneration gas stream circuit having a heating coil 116 disposed therein. The outlet of the heating coil 116 is connected by a conduit 118 to a regeneration gas stream inlet header 120. The header 120 is connected to the conduits 32, 34, 36 and 38 by conduits 122, 124, 126 and 128 respectively. Valves 130, 132, 134 and 136 are disposed in the conduits 122, 124, 126 and 128. A regeneration gas stream outlet header 138 is provided connected to the conduits 40, 42, 44 and 46 by conduits 140, 142, 144 and 146 respectively. Valves 148, 150, 152 and 154 are disposed in the conduits 140, 142, 144 and 146. The regeneration gas stream outlet header 138 is connected by a conduit 156 to a conventional gas stream cooler 158. A valve 160 is disposed in the conduit 156, and the outlet of the gas cooler 158 is connected by a conduit 162 to the inlet of a conventional gas-liquid separator 164. The liquid outlet of the separator 164 is connected to a conduit 166 having a conventional liquid level control valve 168 disposed therein. The gas outlet connection of the separator 164 is connected by a conduit 170 to a conventional gas booster 172. The discharge connection of the gas booster 172 is connected by a conduit 174 to the inlet connection of a heating coil 116 disposed in the heater 114. A cooler and separator bypass conduit 176 is connected to the conduit 156 upstream of the valve 160 and to the conduit 170. A valve 178 is disposed in the conduit 176.

A closed cooling gas stream circuit is provided including a cooling gas stream inlet header 180 connected to the conduits 32, 34, 36 and 38 by conduits 182, 184, 186 and 188 respectively. Valves 190, 192, 194 and 196 are disposed in the conduits 182, 184, 186 and 188. A cooling gas stream outlet header 198 is provided connected to the conduits 40, 42, 44 and 46 by conduits 200, 202, 204 and 206 respectively. Valves 208, 210, 212 and 214 are disposed in the conduits 200, 202, 204 and 206. The header 198 is connected by a conduit 216 to a conventional gas cooler 218. The discharge connection of the gas cooler 218 is connected by a conduit 220 to the suction of a conventional gas booster 222. The conduit 110, previously described, is connected to the conduit 220. The discharge of the gas booster 222 is connected by a conduit 224 to the cooling gas stream inlet header 180.

OPERATION OF THE SYSTEM 10

By the present invention as carried out in the system 10, the inlet gas stream is passed through one of the vessels 16, 18, 20 and 22 so that it contacts the adsorbent bed contained therein and adsorbable components which are difficult to regenerate are adsorbed on the bed. The bed is continuously contacted with the inlet gas stream over a long cycle time and as a result, the residue gas stream produced contains easy-to-regenerate adsorbable components. The residue gas stream is passed through another of the adsorbent beds contained within the vessels 16, 18, 20 and 22 so that easy-to-regenerate components are adsorbed thereon and an effluent gas stream substantially free of adsorbable components is produced. The flow patterns of the residue gas stream, the heated regeneration gas stream and the cooling gas stream are changed or cycled on a short cycle time so that the three beds not adsorbing difficult-to-regenerate components from the inlet gas stream are operated in a manner such that one of the beds adsorbs easy-to-regenerate components from the residue gas stream, one of the beds is contacted with a heated regeneration gas stream so that easy-to-regenerate components are desorbed therefrom and the other bed is contacted with the cooling gas stream. After a predetermined number of short cycles, the adsorbent bed previously on the long cycle is subjected to extensive regeneration during the next short cycle by contact with a heated regeneration gas stream at a high temperature and flow rate. In addition, the flow patterns of the various gas streams are changed so that a different bed is contacted with the inlet gas stream during the next long cycle while the other three beds are operating on the short cycle. By periodically subjecting each of the adsorbent beds contained within the vessels 16, 18, 20 and 22 to an extensive regeneration, adsorbed difficult-to-regenerate components are removed therefrom, and the buildup of difficult-to-regenerate components on the adsorbent beds is prevented. Further, the operation of three of the adsorbent beds on a short cycle allows the recovery of an increased quantity of easy-to-regenerate components contained in the inlet gas stream as compared to prior art processes.

Figure 2:
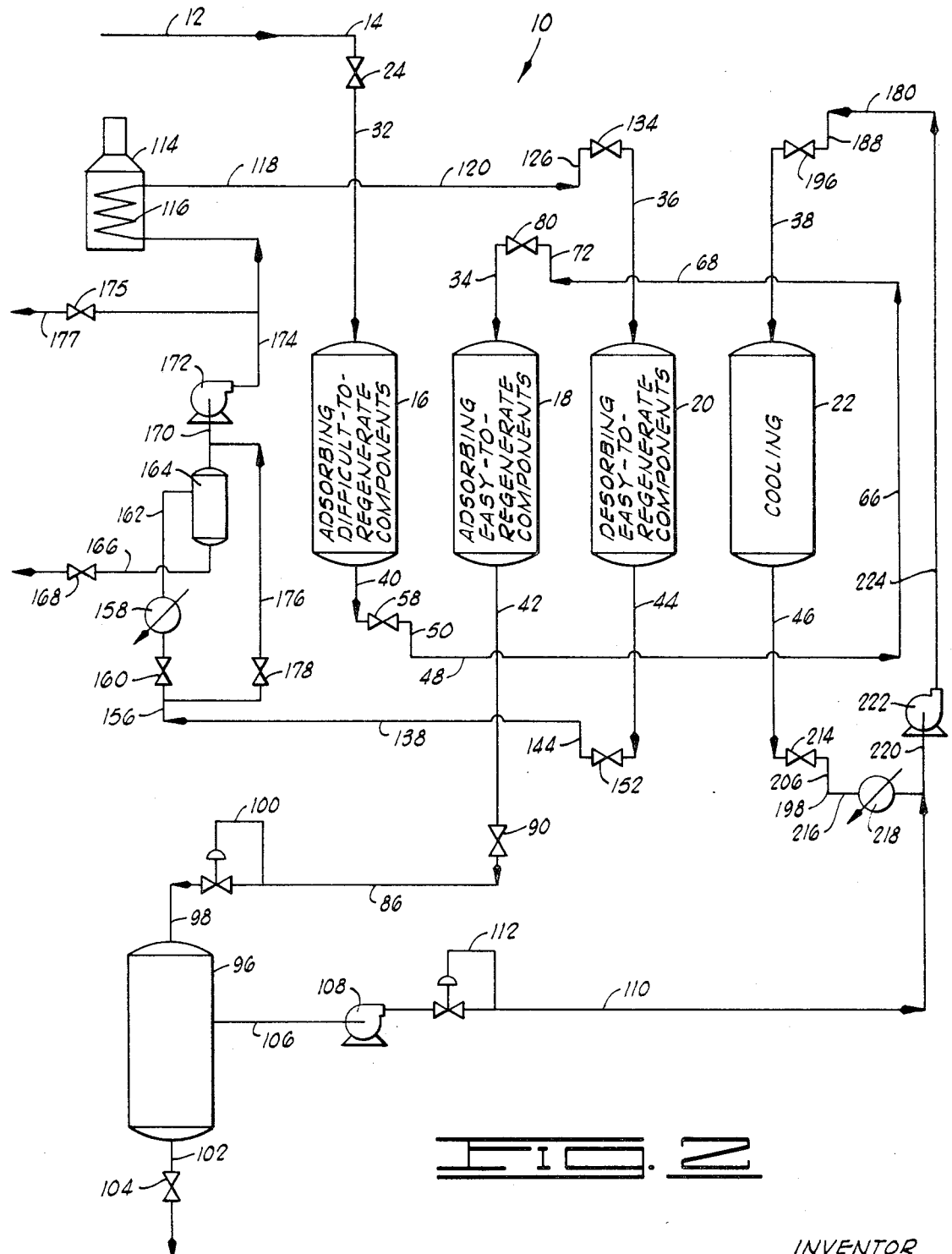
FIG. 2 illustrates the gas stream flow patterns through the system of FIG. 1 during a first cycle.

Referring specifically to FIG. 2, the flow patterns of the various gas streams in the system 10 during a first cycle are shown. Let it be assumed that the adsorbent bed contained within the vessel 16 is contacting the inlet gas stream over the long cycle time and the adsorbent bed within the vessel 18 is contacting the residue gas stream from the vessel 16. The inlet gas stream is conducted to the system 10 by way of the conduit 12. From the conduit 12, the inlet gas stream passes by way of the header 14, conduit 32 and valve 24 into the vessel 16. The conduits 34, 36 and 38, and the valves 26, 28 and 30 serve to conduct the inlet gas stream to the vessels 18, 20 and 22 during subsequent cycles. While the inlet gas stream passes through the adsorbent bed contained within the vessel 16, difficult-to-regenerate components are adsorbed on the bed, and a residue gas stream consisting primarily of easy-to-regenerate components is produced. The residue gas stream exits the vessel 16 by way of conduits 40 and 50, and valve 58, and passes into the residue gas stream outlet header 48. During subsequent cycles, the conduits 42, 52, 44, 54, 46 and 56, and the valves 60, 62 and 64 serve similarly to conduct the residue gas stream to the header 48. From the header 48, the residue gas stream is passed by way of conduit 66 into the residue gas stream inlet header 68. From the header 68, the residue gas stream is conducted by conduit 72, conduit 34, and valve 80 into the vessel 18. During subsequent cycles the conduits 32, 70, 36, 74, 38 and 76, and the valves 78, 82 and 84 serve to conduct the residue gas stream into the vessels 16, 20 and 22. While passing through the vessel 18, the residue gas stream contacts the adsorbent bed contained therein and easy-to-regenerate components are adsorbed on the bed thereby producing an effluent gas stream substantially free of adsorbable components. The effluent gas stream exits the vessel 18 by way of conduit 42 and valve 90 and passes into the effluent gas stream outlet header 86. During subsequent cycles, the conduits 40, 44 and 46 and valves 88, 92 and 94 serve similarly. From the header 86, the effluent gas stream passes by way of conduit 98 into the ballast tank 96, the operation of which will be described further hereinbelow. From the ballast tank 96 the effluent gas stream is conducted by the conduit 102 to a point of further processing or distribution.

Let it be assumed that the adsorbent bed within the vessel 20 is being regenerated to remove easy-to-regenerate components therefrom. A heated regeneration gas stream is passed from the regeneration gas stream inlet header 120 into the vessel 20 by way of conduits 126 and 36, and valve 134. Conduits 122, 32, 124, 34, 128 and 38 and valves 130, 132 and 136 serve similarly during subsequent cycles when the adsorbent beds within the vessels 16, 18 and 22 are being regenerated. As the heated regeneration gas stream passes through the vessel 20, it contacts the adsorbent bed contained therein and causes previously adsorbed easy-to-regenerate components to be desorbed from the bed into the regeneration gas stream. The regeneration gas stream containing desorbed easy-to-regenerate components exits the vessel 20 by way of conduit 44, valve 152 and conduit 144, and passes into the regeneration gas stream outlet header 138. During subsequent cycles, the conduits 40, 140, 42, 142, 46 and 146, and the valves 148, 150 and 154 serve similarly. From the header 138, the regeneration gas stream is passed either through the gas cooler 158 and into the separator 164, or through the bypass conduit 176. If the easy-to-regenerate components are of the condensible type, the regeneration gas stream is passed by way of conduit 156 and valve 160 into the gas cooler 158. While passing through the gas cooler 158 the easy-to-regenerate components are condensed, and the condensed components and remaining regeneration gas stream pass by way of conduit 162 into the separator 164. The condensed components are separated from the regeneration gas stream in the separator 164, and are withdrawn therefrom by way of conduit 166 and valve 168 from where they are conducted to storage facilities (not shown) or to a point of further processing. From the separator 164 the regeneration gas stream passes by way of conduit 170 into the suction of the gas booster 172.

If the easy-to-regenerate components are of the noncondensible type, the regeneration gas stream is passed from the header 138 into the bypass conduit 176 by way of conduit 156 and valve 178. The conduit 176 conducts the regeneration gas stream containing easy-to-regenerate components to the conduit 170. The regeneration gas stream is then passed through gas booster 172 and into conduit 174. A portion of the regeneration gas is withdrawn from the system 10 as a product stream by way of conduit 177 connected to the conduit 174.

The remaining regeneration gas stream is passed to the suction connection of the gas booster 172. The gas booster 172 functions to raise the pressure of the regeneration gas stream so that it circulates through the regeneration gas stream circuit. From the gas booster 172 the regeneration gas stream is passed into the conduit 174 from where it is conducted to the heating coil 116 of the gas heater 114. The regeneration gas stream is heated to a desired temperature level while passing through the heating coil 116 of the heater 114. From the heater 114, the heated regeneration gas stream is conducted back to the regeneration gas stream inlet header 120 by the conduit 118.

Let it be assumed that the adsorbent bed within the vessel 22 is in the process of being cooled. As shown in FIG. 2, a cooling gas stream is passed from the cooling gas stream inlet header 180 by way of conduits 188 and 38, and valve 196, into the vessel 22. During subsequent cycles when the adsorbent beds within the vessels 16, 18 and 20 are cooled, conduits 32, 182, 34, 184, 36 and 186, and valves 190, 192 and 194 serve to conduct the cooling gas stream into the vessels 16, 18 and 20. As the cooling gas stream passes through the vessel 22, it contacts the adsorbent bed contained therein, cooling the bed and heating the cooling gas stream. The heated cooling gas stream exits the vessel 22 by way of conduits 46 and 206, and valve 214, and passes into the cooling gas stream outlet header 198. During subsequent cycles the conduits 40, 200, 42, 202, 44 and 204 and the valves 208, 210 and 212 serve similarly. From the header 198, the heated cooling gas stream passes by way of conduit 216 into the gas cooler 218. While the cooling gas stream passes through the gas cooler 218, the heat removed from the adsorbent bed contained within the vessel 22 is removed from the cooling gas stream. The cooling gas stream is then passed by way of conduit 220 into the gas booster 222 which functions to circulate the cooling gas stream through the cooling gas circuit. From the gas booster 222 the cooling gas stream is conducted by the conduit 224 back to the inlet header 180.

As mentioned above, the flow patterns of the residue gas stream, the cooling gas stream and the heated regeneration gas stream are changed at the beginning of each short cycle, while the flow pattern of the inlet gas stream is changed at the beginning of each long cycle. As will be understood, a variety of cycle times may be used depending upon the particular gas stream being processed in the system 10, and other operating and design conditions. In order to present a clear understanding of the manner in which the flow patterns of the various gas streams passing through the system 10 are changed, the adsorbent bed and valve sequence for the system 10 through 10 short cycles is shown in Table I. Table I is based on a long cycle time equal to four short cycle times.

TABLE I

ADSORBENT BED AND VALVE SEQUENCE FOR THE SYSTEM 10

| Adsorbent Bed | First Cycle | Second Cycle | Third Cycle | Fourth Cycle | Fifth Cycle | Sixth Cycle | Seventh Cycle | Eighth Cycle | Ninth Cycle | Tenth Cycle |
|---|---|---|---|---|---|---|---|---|---|---|
| 16 | Adsorbing[1] | Adsorbing[1] | Adsorbing[1] | Adsorbing[1] | Desorbing[2] | Cooling | Adsorbing[1] | Desorbing[1] | Cooling | Adsorbing[1] |
| 18 | Adsorbing | Desorbing | Cooling | Adsorbing | Adsorbing[1] | Adsorbing[1] | Adsorbing[1] | Adsorbing[1] | Desorbing[2] | Cooling |
| 20 | Desorbing | Cooling | Adsorbing | Desorbing | Cooling | Adsorbing | Desorbing | Cooling | Adsorbing[1] | Desorbing[1] |
| 22 | Cooling | Adsorbing | Desorbing | Cooling | Adsorbing | Desorbing | Cooling | Adsorbing | Adsorbing[1] | Adsorbing[1] |

Valves

| | First Cycle | Second Cycle | Third Cycle | Fourth Cycle | Fifth Cycle | Sixth Cycle | Seventh Cycle | Eighth Cycle | Ninth Cycle | Tenth Cycle |
|---|---|---|---|---|---|---|---|---|---|---|
| 24 | Open | Open | Open | Open | Closed | Closed | Closed | Closed | Closed | Closed |
| 26 | Closed | Closed | Closed | Closed | Open | Open | Open | Open | Closed | Closed |
| 28 | Closed | Closed | Closed | Closed | Closed | Closed | Closed | Closed | Closed | Closed |
| 30 | Closed | Closed | Closed | Closed | Closed | Closed | Closed | Closed | Open | Open |
| 58 | Open | Open | Open | Open | Open | Open | Open | Open | Closed | Closed |
| 60 | Closed | Closed | Closed | Closed | Closed | Closed | Closed | Closed | Closed | Closed |
| 62 | Closed | Closed | Closed | Closed | Closed | Closed | Closed | Closed | Open | Open |
| 64 | Closed | Closed | Closed | Closed | Closed | Closed | Open | Closed | Closed | Open |
| 78 | Open | Closed | Closed | Open | Closed | Closed | Closed | Closed | Closed | Closed |
| 80 | Closed | Closed | Closed | Closed | Closed | Open | Closed | Closed | Closed | Closed |
| 82 | Closed | Closed | Open | Closed | Closed | Closed | Closed | Open | Open | Open |
| 84 | Closed | Open | Closed | Closed | Open | Closed | Open | Closed | Closed | Closed |
| 88 | Closed | Closed | Closed | Closed | Closed | Closed | Closed | Closed | Closed | Closed |
| 90 | Open | Open | Open | Open | Closed | Open | Closed | Closed | Closed | Closed |
| 92 | Closed | Closed | Closed | Closed | Closed | Closed | Closed | Closed | Closed | Closed |
| 94 | Closed | Open | Closed | Closed | Open | Closed | Closed | Open | Open | Closed |
| 130 | Closed | Closed | Closed | Closed | Closed | Closed | Closed | Closed | Closed | Closed |
| 132 | Open | Open | Open | Open | Closed | Closed | Closed | Open | Open | Open |
| 134 | Closed | Closed | Closed | Open | Closed | Open | Open | Closed | Closed | Closed |
| 136 | Closed | Closed | Open | Closed | Closed | Closed | Closed | Closed | Closed | Closed |
| 148 | Closed | Closed | Closed | Closed | Open | Open | Closed | Open | Closed | Closed |
| 150 | Closed | Open | Closed | Open | Closed | Closed | Open | Closed | Open | Closed |
| 152 | Open | Closed | Open | Closed | Closed | Closed | Open | Closed | Closed[4] | Open |
| 154 | Closed | Closed | Open | Closed | Closed | Open | Closed | Closed | Open[4] | Closed |
| 160 | Closed | Closed | Closed | Closed | Open[4] | Closed | Closed | Closed | Closed | Closed |
| 175 | Open[3] | Open[3] | Open[3] | Open[3] | Closed | Open[3] | Open[3] | Open[3] | Closed | Open[3] |
| 178 | Open[3] | Open[3] | Open[3] | Open[3] | Closed | Open[3] | Open[3] | Open[3] | Closed | Open[3] |

(TABLE I - Continued)

| Valve | First Cycle | Second Cycle | Third Cycle | Fourth Cycle | Fifth Cycle | Sixth Cycle | Seventh Cycle | Eighth Cycle | Ninth Cycle | Tenth Cycle |
|---|---|---|---|---|---|---|---|---|---|---|
| 190 | Closed | Closed | Closed | Closed | Closed | Open | Closed | Closed | Open | Closed |
| 192 | Closed | Closed | Open | Closed | Closed | Closed | Closed | Closed | Closed | Open |
| 194 | Closed | Open | Closed | Closed | Open | Closed | Closed | Open | Closed | Closed |
| 196 | Open | Closed | Closed | Open | Closed | Closed | Open | Closed | Closed | Closed |
| 208 | Closed | Closed | Closed | Closed | Closed | Open | Closed | Closed | Open | Closed |
| 210 | Closed | Closed | Open | Closed | Closed | Closed | Closed | Closed | Closed | Open |
| 212 | Closed | Open | Closed | Closed | Open | Closed | Closed | Open | Closed | Closed |
| 214 | Open | Closed | Closed | Open | Closed | Closed | Open | Closed | Closed | Closed |

Figure 3:
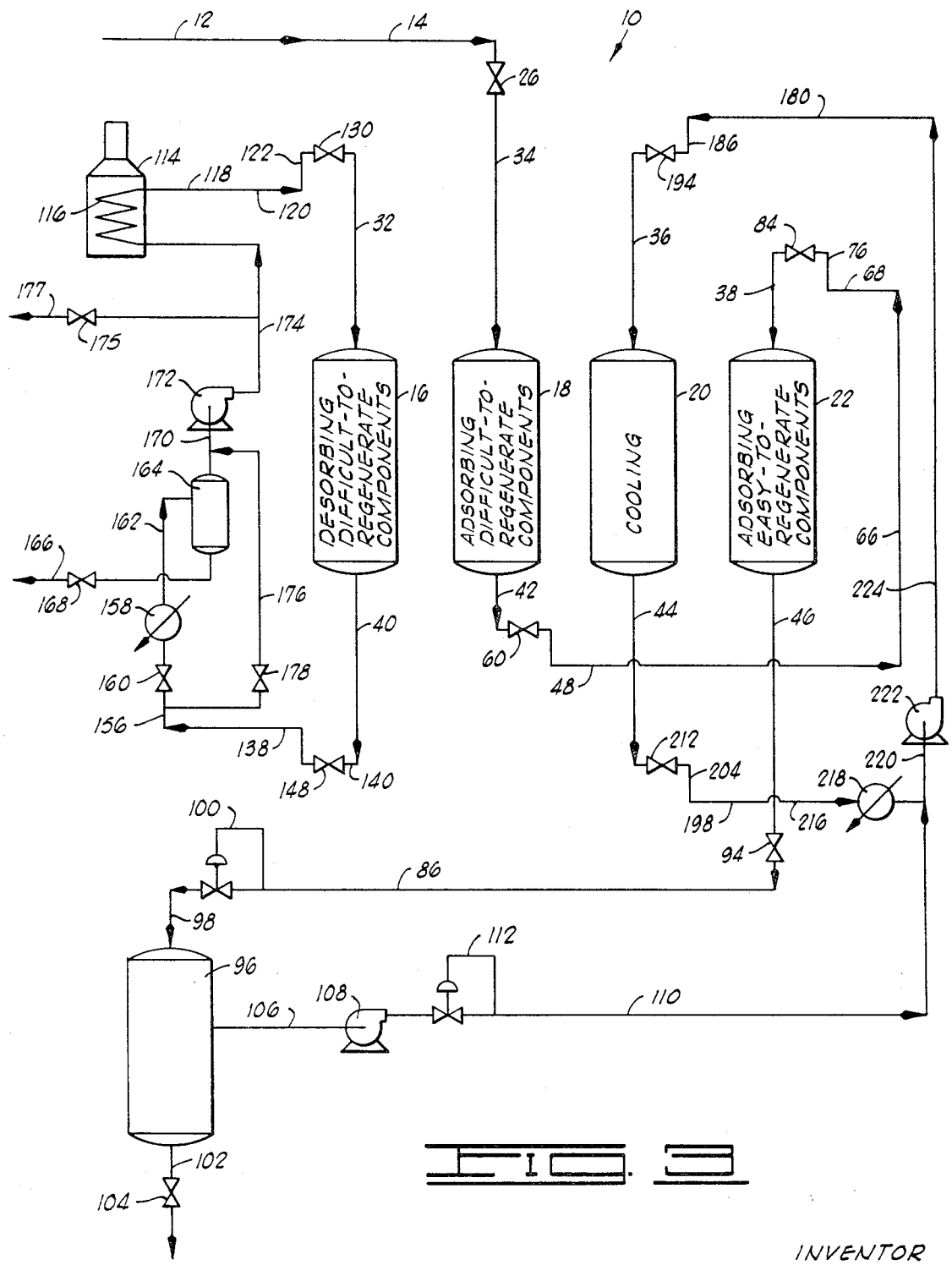
FIG. 3 illustrates the gas stream flow patterns through the system of FIG. 1 during a fifth cycle.

[1] Adsorbing difficult-to-regenerate components
[2] Desorbing difficult-to-regenerate components
[3] Easy-to-regenerate components removed in vapor form
[4] Difficult-to-regenerate components removed in liquid form Referring now to FIG. 3, the flow patterns of the various gas streams passing through the system 10 are illustrated during the fifth short cycle. As shown in Table I, the inlet gas stream is passed through the adsorbent bed contained within the vessel 16 during the long cycle time (short cycles one through four) thereby causing difficult-to-regenerate components to be adsorbed on the bed. The flow patterns of the residue gas stream, the regeneration gas stream and cooling gas stream are changed during the first four short cycles so that the adsorbent beds within the vessels 18, 20 and 22 adsorb easy-to-regenerate components, the easy-to-regenerate components are regenerated by contact with the heated regeneration gas stream, and the beds are cooled. At the beginning of the fifth cycle, the flow pattern of the inlet gas stream is changed so that it is passed through the adsorbent bed contained within the vessel 18 which adsorbed easy-to-regenerate components in the preceding short cycle. Referring still to FIG. 3, the inlet gas stream is passed by way of conduit 12 into the header 14. From the header 14, the inlet gas stream is passed into the vessel 18 by way of conduit 34 and valve 26. As the inlet gas stream is passed through the adsorbent bed contained within the vessel 18, difficult-to-regenerate components are adsorbed thereon thereby displacing previously adsorbed easy-to-regenerate components therefrom. The residue gas stream containing easy-to-regenerate components exits the vessel 18 by way of conduit 42 and valve 60, and passes into the residue gas stream outlet header 48. From the header 48, the residue gas stream passes by way of conduit 66 into the residue gas stream inlet header 68 from where it is conducted to the vessel 22 by way of conduit 76, valve 84 and conduit 38. While passing through the adsorbent bed contained within the vessel 22, easy-to-regenerate components are adsorbed from the residue gas stream and the effluent gas stream produced exits the vessel 22 by way of the conduit 46 and valve 94, and passes into the effluent gas stream outlet header 86. From the outlet header 86, the effluent gas stream passes by way of conduit 98 into the ballast tank 96 and is removed from the ballast tank 96 by way of conduit 102.

As shown in Table I, the adsorbent bed contained within the vessel 16 is regenerated during the fifth cycle so that difficult-to-regenerate components adsorbed thereon during the first four cycles are removed therefrom. In order to effectively bring about the desorption of the difficult-to-regenerate components during the fifth cycle, the adsorbent bed is contacted with a regeneration gas stream of high flow rate and temperature as compared to the flow rate and temperature of the regeneration gas stream used to desorb easy-to-regenerate components from the adsorbent beds. This is accomplished in the system 10 by providing high capacity equipment in the regeneration gas circuit. That is, the gas cooler 158, gas separator 164, gas compressor 172, gas heater 114 and the associated conduits and valves are sized such that a regeneration gas stream of the high flow rate and temperature required is generated during the cycles that difficult-to-regenerate components are desorbed from an adsorbent bed. The adsorbent bed contained within the vessel 16 is contacted with the heated regeneration gas stream of high flow rate and temperature which is passed from the regeneration gas stream inlet header 120 to the vessel 16 by way of conduits 122 and 32 and valve 130. As the heated regeneration gas stream contacts the adsorbent bed contained within the vessel 16, difficult-to-regenerate components are desorbed therefrom into the regeneration gas stream. The regeneration gas stream exits the vessel 16 by way of conduits 40 and 140, and valve 148, and is passed into the regeneration gas stream outlet header 138. From the header 138, the regeneration gas stream is passed by way of conduit 156 and valve 160 into the gas cooler 158. Difficult-to-regenerate components contained in the regeneration gas stream are condensed in the gas cooler 158, and the regeneration gas stream and condensed components exit the gas cooler 158 by way of conduit 162, and pass into the separator 164. While within the separator 164, the condensed difficult-to-regenerate components are separated from the regeneration gas stream, and are removed therefrom by way of conduit 166 and valve 168. From the separator 164, the regeneration gas stream passes by way of conduit 170 to the gas booster 172 and then by way of conduit 174 into the heating coil 116 of the gas stream heater 114. From the heater 114, the regeneration gas stream circulates by way of conduit 118 back to the regeneration gas stream inlet header 120.

During the fifth cycle, the adsorbent bed contained within the vessel 20 is cooled by contact with the cooling gas stream. The cooling gas stream is passed from the cooling gas stream inlet header 180 into the vessel 20 by way of conduits 186 and 36, and valve 194. While passing through the adsorbent bed contained within the vessel 20, the cooling gas stream cools the adsorbent bed, and exits the vessel 20 by way of conduits 44 and 204, and valve 212. The cooling gas stream then passes into the cooling gas stream outlet header 198, and into the gas stream cooler 218 by way of conduit 216 wherein it is cooled. The cooling gas stream exits the gas stream cooler 218 by way of conduit 220 and passes into the gas booster 222. From the gas booster 222, the cooling gas stream is circulated by way of conduit 224 back into the cooling gas stream inlet header 180.

As will be understood by those skilled in the art, as a bed of adsorbent is cooled by contact with a cooling gas stream confined within a closed circuit, a portion of the cooling gas stream is adsorbed on the bed. This reduces the volume of cooling gas circulated which in turn brings about a decrease in the cooling gas stream pressure. In order to maintain the pressure of the cooling gas stream at a relatively constant level, it is necessary to add a quantity of make up gas to the cooling gas stream. Because the process of the present invention brings about the recovery of a high percentage of the adsorbable components contained in the inlet gas stream, and quite often the inlet gas stream is comprised primarily of adsorbable components, the flow rate of the effluent gas stream withdrawn from the system 10 is relatively low. In fact, depending upon the particular inlet gas stream processed, the rate of effluent gas produced may decrease to a very low flow rate during each short cycle. Thus, if a constant volume of effluent gas is withdrawn from the system 10, the pressure level of the gas streams passing therethrough may be decreased drastically. In order to maintain the pressure level of the gas streams at a relatively constant level, and to insure that effluent gas is available as make up to the cooling gas stream circuit during each cycle, the ballast tank 96 is provided. In operation of the system 10, the upstream pressure controller 100 disposed in the conduit 98 is set to maintain the effluent gas within the header 86 at a constant pressure. The check valve 104 is provided in the conduit 102 so that effluent gas is withdrawn from the ballast tank 96 only when the pressure level therein exceeds the pressure downstream of the check valve 104. For example, the system 10 may be operated at a pressure of 1,000 psia with the effluent gas stream produced being conducted to a distribution system operated at a pressure of 700 psia. Thus, as long as the pressure within the ballast tank 96 is above 700 psia, effluent gas will pass through the conduit 102 and check valve 104 into the distribution system. However, during periods when make up gas is being withdrawn from the ballast tank 96 and/or when the effluent gas produced by the system 10 decreases, the pressure within the ballast tank 96 may decrease to a level below 700 psia. The check valve 104 prevents the backflow of effluent gas from the distribution system in this event.

Make up gas is withdrawn from the ballast tank 96 by way of conduit 106 which is connected to a gas booster 108. The gas booster 108 functions to pump gas into the cooling gas stream circuit by way of the conduit 110 when the pressure controller 112 disposed in the conduit 110 is open. As will be understood, the pressure controller 112 is set at the desired cooling gas stream pressure level so that when the pressure of the cooling gas stream decreases, the controller 112 opens thereby causing make up gas to pass into the cooling gas stream circuit.

Figure 4:
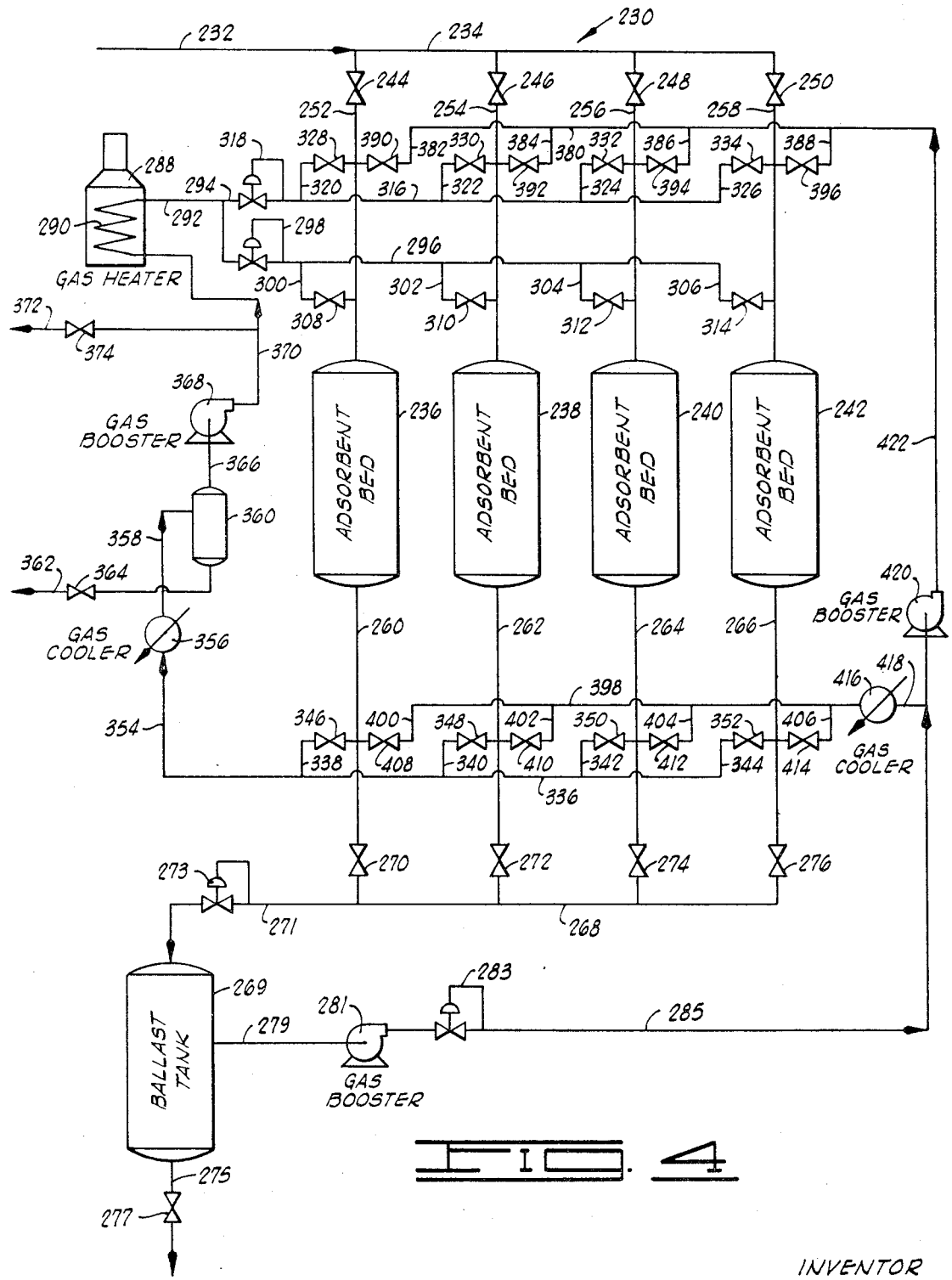
FIG. 4 illustrates an alternate system for carrying out the process of the present invention in diagrammatic form.

Referring now to FIG. 4, an alternate system which may be used for carrying out the process of the present invention, generally designated by the numeral 230, is illustrated. The system 230 differs from the system 10 described above in that instead of adsorbing difficult-to-regenerate components from the inlet gas stream over the long cycle, one of the adsorbent beds in the system 230 is subjected to extensive regeneration over the long cycle. The other beds are operated on a short cycle with each of the beds adsorbing both difficult-to-regenerate and easy-to-regenerate adsorbable components from the inlet gas stream. The beds operated on the short cycle are partially regenerated so that easy-to-regenerate components are desorbed therefrom during the short cycle, and as the beds operated on the short cycle become loaded with difficult-to-regenerate components, they are subjected to extensive regeneration on the long cycle.

A multi-component inlet gas stream containing adsorbable components is conducted to the system 230 by way of an inlet conduit 232. From the conduit 232, the inlet gas stream passes into an inlet gas stream header 234 from where it is routed to one of four vessels 236, 238, 240 and 242, each containing a fixed bed of solid adsorbent. The inlet gas stream is conducted to one of the four vessels by means of conduits 252, 254, 256 and 258 which are connected to the header 234 and to inlet connections disposed in the vessels 236, 238, 240 and 242. Valves 244, 246, 248 and 250 are disposed in the conduits 252, 254, 256 and 258.

Conduits 260, 262, 264 and 266 are connected to outlet connections in the vessels 236, 238, 240 and 242, respectively, and a residue gas outlet header 268 is connected to the conduits 260, 262, 264 and 266. Valves 270, 272, 274 and 276 are disposed in the conduits 260, 262, 264 and 266. The header 268 is connected to a ballast tank 269 by a conduit 271, and a conventional upstream pressure controller 273 is disposed in the conduit 271. The outlet connection of a ballast tank 269 is connected to a conduit 275 having a conventional check valve 277 disposed therein. A conduit 279 is connected to the ballast tank 269 and to the suction connection of a conventional gas booster 281. The discharge connection of the gas booster 281 is connected to a conduit 285 having a conventional downstream pressure controller 283 disposed therein.

A closed regeneration gas stream circuit for simultaneously regenerating two of the adsorbent beds contained within the vessels 236, 238, 240 and 242 is provided. A conventional gas stream heater 288 having a heating coil 290 disposed therein is included in the regeneration gas stream circuit. The outlet connection of the heating coil 290 is connected by a conduit 292 to a header 294. A first heated regeneration gas stream inlet head 296 is provided connected to the header 294 having a conventional gas stream flow controller 298 disposed therein. The first regeneration gas stream inlet header 296 is connected to the conduits 252, 254, 256 and 258 by conduits 300, 302, 304 and 306 respectively. Valves 308, 310, 312 and 314 are disposed in the conduits 300, 302, 304 and 306.

A second heated regeneration gas stream inlet header 316 is provided connected to the header 294 having a conventional gas stream flow controller 318 disposed therein. The header 316 is connected to the conduits 252, 254, 256 and 258 by conduits 320, 322, 324 and 326 respectively. Valves 328, 330, 332 and 334 are disposed in the conduits 320, 322, 324 and 326. A combined regeneration gas stream outlet header 336 is provided connected to the conduits 260, 262, 264 and 266 by conduits 338, 340, 342 and 344, respectively. Valves 346, 348, 350 and 352 are disposed in the conduits 338, 340, 342 and 344. The combined regeneration gas stream outlet header 336 is connected to a conventional gas cooler 356 by a conduit 354. The outlet connection of the gas stream cooler 356 is connected to a conventional gas-liquid separator 360 by a conduit 358. The liquid outlet connection of the separator 360 is connected to a conduit 362 having a conventional liquid level control valve 364 disposed therein, and the gas outlet connection of the separator 360 is connected to a conventional gas booster 368 by a conduit 366. The discharge connection of the gas booster 368 is connected to the inlet connection of the heating coil 290 disposed within the heater 288 by a conduit 370. A conduit 372 having a valve 374 disposed therein is connected to the conduit 370 for withdrawing an easy-to-regenerate component product stream from the regeneration gas stream passing through the regeneration gas stream circuit.

A closed cooling gas stream circuit is provided which includes a cooling gas stream inlet header 380 connected to the conduits 252, 254, 256 and 258 by conduits 382, 384, 386 and 388, respectively. Valves 390, 392, 394 and 396 are disposed in the conduits 382, 384, 386 and 388. A cooling gas stream outlet header 398 is provided connected to the conduits 260, 262, 264 and 266 by conduits 400, 402, 404 and 406 respectively. Valves 408, 410, 412 and 414 are disposed in the conduits 400, 402, 404 and 406. The cooling gas stream outlet header 398 is connected to a conventional gas stream cooler 416 which is in turn connected to a conventional gas compressor or gas booster 420 by a conduit 418. The conduit 285, previously described, is connected to the conduit 418. The discharge connection of the gas booster 420 is connected to the cooling gas stream inlet header 380 by a conduit 422.

OPERATION OF THE SYSTEM 230

By the present invention, as carried out in the system 230, one of the adsorbent beds contained within the vessels 236, 238, 240 and 242 is extensively regenerated over a long cycle time while the other three beds are operated on a short cycle time. The flow patterns of the inlet gas stream, the first heated regeneration gas stream and the cooling gas stream are changed at the beginning of each short cycle so that the three beds are operated in a manner such that one bed adsorbs both easy-to-regenerate and difficult-to-regenerate components from the inlet gas stream, one bed is contacted with the first heated regeneration gas stream so that easy-to-regenerate components are desorbed therefrom, and the other bed is contacted with the cooling gas stream. The bed being regenerated on the long cycle is contacted with the second heated regeneration gas stream so that difficult-to-regenerate components are desorbed therefrom. After a predetermined number of short cycles, the bed subjected to extensive regeneration on the long cycle is switched into the short cycle operation, and one of the beds operated on the short cycle which has become loaded with difficult-to-regenerate components is switched into the long cycle operation. Thus, as in the system 10 described above, each of the beds is subjected to extensive regeneration to remove difficult-to-regenerate components adsorbed thereon thereby preventing the buildup of difficult-to-regenerate components on the adsorbent beds.

Figure 5:
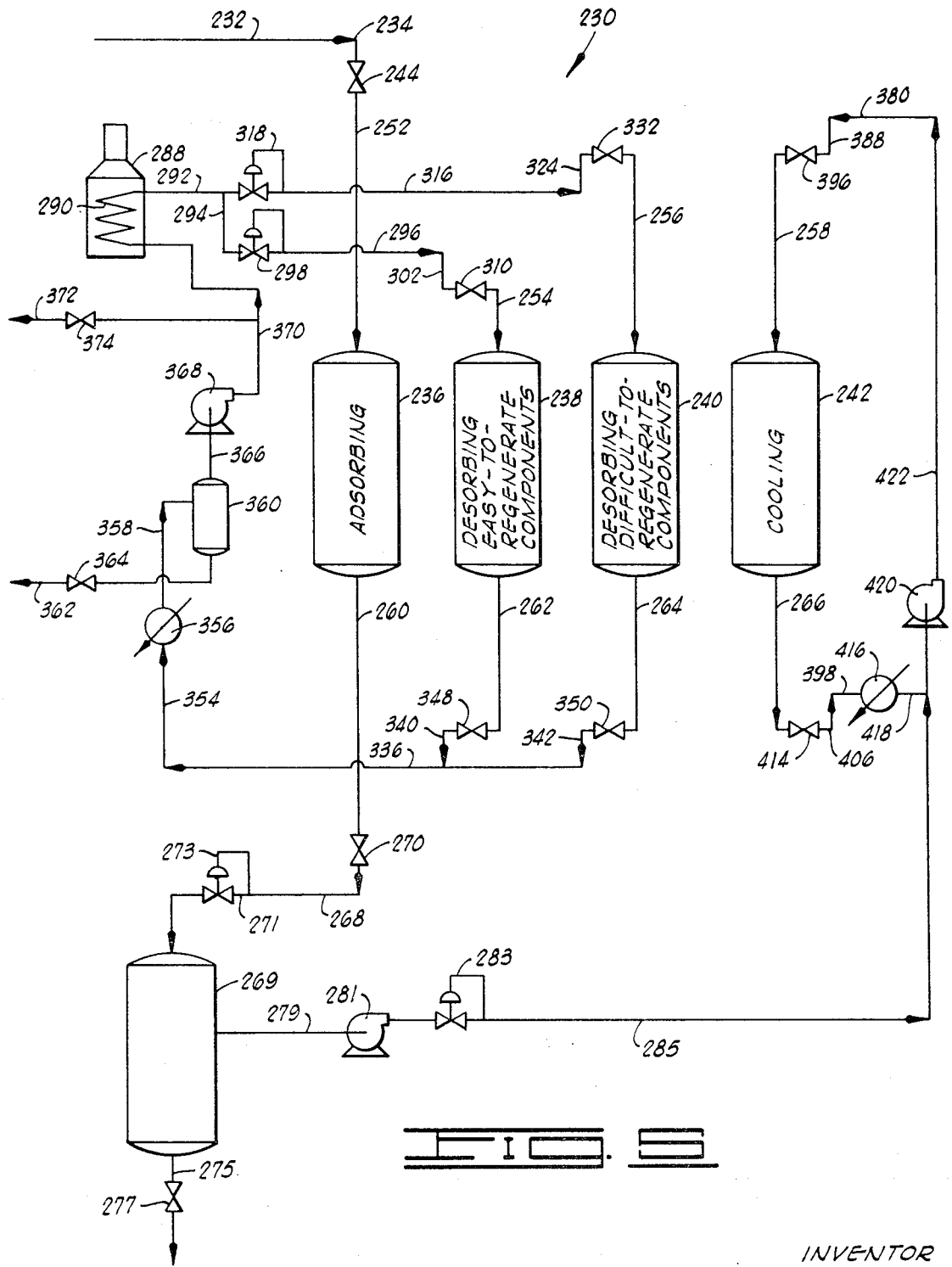
FIG. 5 illustrates the gas stream flow patterns through the system of FIG. 4 during a first cycle.

Referring specifically to FIG. 5, the flow patterns of the various gas streams in the system 230 during a first cycle are shown. Let is be assumed that the adsorbent bed contained within the vessel 236 is contacting the inlet gas stream. The inlet gas stream is conducted to the system 230 by way of the conduit 232 and passes into the inlet gas stream header 234. From the header 234, the inlet gas stream passes by way of conduit 252 and valve 244 into the vessel 236. The conduits 254, 256 and 258, and valves 246, 248 and 250 serve similarly during subsequent cycles. As the inlet gas stream passes through the adsorbent bed contained within the vessel 236, the adsorbable components contained therein are adsorbed on the bed and a residue gas stream substantially free of the adsorbable components is produced. The residue gas stream exits the vessel 236 by way of conduit 260 and valve 270, and passes into the residue gas stream outlet header 268. During subsequent cycles the conduits 262, 264 and 266, and valves 272, 274 and 276 serve similarly. From the header 268, the residue gas stream passes by way of conduit 271 into the ballast tank 269. From the ballast tank 269 the residue gas stream is withdrawn by way of a conduit 275 from where it is conducted to a point of use or further processing. The operation of the ballast tank 269 and the cooling gas stream make up apparatus connected thereto is identical to the operation of the ballast tank 96 and make up gas apparatus of the system 10, described above.

Let it be assumed that the adsorbent bed within the vessel 238 is being regenerated on the short cycle so that easy-to-regenerate components are desorbed therefrom, and the adsorbent bed within the vessel 240 is being subjected to extensive regeneration during the long cycle. Referring still to FIG. 5, the first heated regeneration gas stream is conducted from the first heated regeneration gas stream inlet header 296 to the vessel 238 by way of conduits 302 and 254, and valve 310. The conduits 300, 252, 304, 256, 306 and 258, and the valves 308, 312 and 314 serve similarly during subsequent cycles. As the first heated regeneration gas stream passes through the adsorbent bed contained within the vessel 238, easy-to-regenerate components are desorbed therefrom into the regeneration gas stream. The regeneration gas stream and desorbed components exit the vessel 238 by way of conduits 262 and 340, and valve 348, and pass into the combined regeneration gas stream outlet header 336. The second heated regeneration gas stream is passed from the second regeneration gas stream inlet header 316 into the vessel 240 by way of conduits 324 and 256, and valve 332. During subsequent cycles, the conduits 320, 252, 322, 254, 326 and 258, and the valves 328, 330 and 334 serve similarly. As the second heated regeneration gas stream passes through the adsorbent bed contained within the vessel 240, difficult-to-regenerate components are desorbed therefrom into the regeneration gas stream. As will be understood, the adsorbent bed within the vessel 240 is contacted with the second regeneration gas stream continuously during the long cycle. The second regeneration gas stream and desorbed components exit the vessel 240 by way of conduits 264 and 342 and valve 350, and pass into the combined regeneration gas stream outlet header 336. The first and second regeneration gas streams and the desorbed easy-to-regenerate and difficult-to-regenerate components are combined in the header 336, and the combined stream passes from the header 336 by way of conduit 354 into the gas cooler 356. While passing through the gas cooler 356, the difficult-to-regenerate components as well as all or part of the easy-to-regenerate components are condensed, and the condensed components and combined regeneration gas stream pass by way of conduit 358 into the separator 360. The condensed components are separated from the combined regeneration gas stream within the separator 360 and are removed therefrom by way of conduit 362. The combined regeneration gas stream exits the separator 360 by way of the conduit 366 and passes into the compressor 368. From the discharge of the compressor 368, the combined regeneration gas stream passes into conduit 370. If the easy-to-regenerate components are of the non-condensible type, and as a result, are not condensed in the gas cooler 356, a portion of the regeneration gas stream containing the easy-to-regenerate components is removed from the conduit 370 by way of conduit 372. The remaining combined regeneration gas stream passes from the conduit 370 into the heating coil 290 of the heater 288 wherein it is heated to a desired temperature level. From the heating coil 290, the combined regeneration gas stream is passed by way of conduit 292 to the header 294 and the combined stream is divided into the first and second regeneration gas streams by the flow controllers 298 and 318. That is, a predetermined flow rate of heated regeneration gas is caused to pass into the second heated regeneration gas stream header 316 and a predetermined flow rate of heated regeneration gas is passed into the first regeneration gas stream inlet header 296.

Let it be assumed that the adsorbent bed within the vessel 242 is being cooled. A cooling gas stream is passed from the cooling gas stream inlet header 380 into the vessel 242 by way of conduits 388 and 258, and valve 396. During subsequent cycles, the conduits 252, 382, 254, 384, 256, and 386, and valves 390, 392 and 394 serve similar purposes. The cooling gas stream exits the vessel 242 by way of conduits 266 and 406 and valve 414, and passes into the cooling gas stream outlet header 398. From the outlet header 398, the cooling gas stream is passed through the gas cooler 416 wherein it is cooled, and then to the gas booster 420 by way of conduit 418. Make up gas required to maintain the pressure of the cooling gas stream at a constant level enters the cooling gas stream circuit by way of conduit 285 which is connected to the conduit 418. The cooling gas stream is circulated from the discharge of the gas booster 420 by way of conduit 422 back to the cooling gas stream inlet header 380.

As mentioned above, the flow patterns of the inlet gas stream, the first heated regeneration gas stream and the cooling gas stream are changed at the beginning of each short cycle, while the flow pattern of the second heated regeneration gas stream is changed at the beginning of each long cycle. In order to present a clear understanding of the manner in which the flow patterns of the various gas streams passing through the system 230 are changed, the adsorbent bed and valve sequence for the system 230 through ten short cycles is shown in Table II. Table II is based on a long cycle time equal to four short cycle times.

TABLE II

ADSORBENT BED AND VALVE SEQUENCE FOR THE SYSTEM 230

| Adsorbent Bed | First Cycle | Second Cycle | Third Cycle | Fourth Cycle | Fifth Cycle | Sixth Cycle | Seventh Cycle | Eighth Cycle | Ninth Cycle | Tenth Cycle |
|---|---|---|---|---|---|---|---|---|---|---|
| 236 | Adsorbing | Desorbing | Cooling | Adsorbing | Desorbing[1] | Desorbing[1] | Desorbing[1] | Desorbing[1] | Desorbing | Cooling |
| 238 | Desorbing[1] | Cooling | Adsorbing[1] | Desorbing[1] | Cooling | Adsorbing | Desorbing | Cooling | Adsorbing | Desorbing |
| 240 | Desorbing[1] | Desorbing[1] | Desorbing | Desorbing[1] | Desorbing | Cooling | Adsorbing | Desorbing | Cooling | Adsorbing[1] |
| 242 | Cooling | Adsorbing | Desorbing | Cooling | Adsorbing | Desorbing | Cooling | Adsorbing | Desorbing[1] | Desorbing[1] |
| Valves | | | | | | | | | | |
| 244 | Open | Closed | Closed | Open | Closed | Closed | Closed | Closed | Closed | Closed |
| 246 | Closed | Closed | Open | Closed | Closed | Open | Closed | Closed | Open | Closed |
| 248 | Closed | Closed | Closed | Closed | Closed | Closed | Open | Closed | Closed | Open |
| 250 | Closed | Open | Closed | Open | Open | Closed | Closed | Open | Closed | Closed |
| 270 | Open | Closed | Open | Closed | Closed | Open | Closed | Closed | Open | Closed |
| 272 | Closed | Closed | Closed | Closed | Closed | Closed | Open | Closed | Closed | Open |
| 274 | Closed | Open | Closed | Closed | Open | Closed | Closed | Open | Closed | Closed |
| 276 | Closed | Open | Closed | Closed | Closed | Closed | Closed | Closed | Closed | Closed |
| 308 | Closed | Closed | Closed | Open | Closed | Closed | Open | Closed | Open | Open |
| 310 | Open | Closed | Closed | Closed | Open | Open | Closed | Open | Closed | Closed |
| 312 | Closed | Closed | Open | Closed | Closed | Open | Closed | Closed | Closed | Closed |
| 314 | Closed | Closed | Closed | Closed | Open | Open | Open | Closed | Closed | Closed |
| 328 | Closed | Closed | Closed | Closed | Open | Closed | Closed | Closed | Closed | Closed |
| 330 | Closed | Closed | Closed | Closed | Closed | Closed | Closed | Closed | Closed | Closed |
| 332 | Open | Open | Open | Open | Open | Open | Open | Open | Open | Open |
| 334 | Closed | Closed | Closed | Closed | Closed | Closed | Closed | Closed | Closed | Closed |
| 346 | Closed | Closed | Closed | Open | Closed | Closed | Open | Closed | Open | Open |
| 348 | Open | Closed | Closed | Open | Closed | Closed | Closed | Open | Closed | Closed[1] |
| 350 | Open | Open | Open | Closed | Closed | Open | Closed | Closed | Open | Open[1] |
| 352 | Closed | Closed | Open | Closed | Closed | Closed | Closed | Closed | Closed | Closed |
| 390 | Closed | Closed | Open | Closed | Open | Closed | Closed | Open | Closed | Closed |
| 392 | Closed | Open | Closed | Closed | Closed | Open | Closed | Closed | Open | Closed |
| 394 | Closed | Closed | Closed | Closed | Closed | Closed | Open | Closed | Closed | Open |
| 396 | Open | Closed | Closed | Open | Closed | Closed | Closed | Open | Closed | Closed |
| 408 | Closed | Closed | Open | Closed | Open | Closed | Closed | Open | Closed | Open |
| 410 | Closed | Open | Closed | Closed | Closed | Open | Closed | Closed | Open | Closed |
| 412 | Closed | Closed | Closed | Closed | Closed | Open | Closed | Closed | Closed | Closed |
| 414 | Open | Closed | Closed | Open | Closed | Closed | Open | Closed | Closed | Closed |

[1] Desorbing difficult-to-regenerate components

Figure 6:
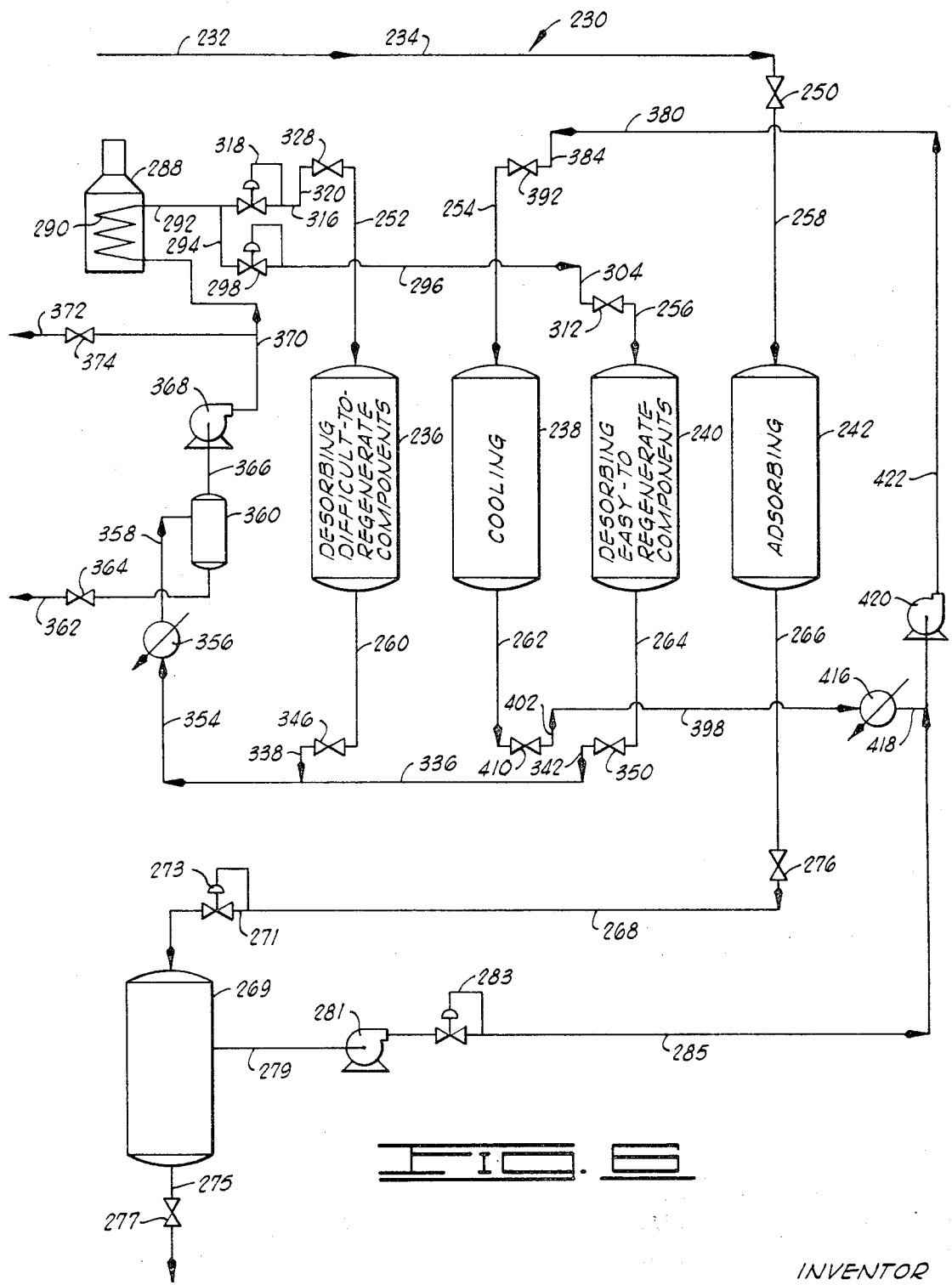
FIG. 6 illustrates the gas stream flow patterns through the system of FIG. 4 during a fifth cycle.

Referring now to FIG. 6, the flow patterns of the various gas streams passing through the system 230 are illustrated during the fifth short cycle. As shown in Table II, the flow patterns of the inlet gas stream, the first regeneration gas stream and the cooling gas stream are changed during the first four short cycles so that the adsorbent beds within the vessels 236, 238, 242 adsorb components from the inlet gas stream, the easy-to-regenerate components are desorbed therefrom by contacting the beds with the first heated regeneration gas stream, and the beds are cooled by contact with the cooling gas stream. The adsorbent bed within the vessel 240 is subjected to extensive regeneration by prolonged contact with the second heated regeneration gas stream during the first four cycles. At the beginning of the fifth cycle, the flow pattern of the second regeneration gas stream is changed so that the adsorbent bed contained within the vessel 240 is contacted by the first heated regeneration gas stream, and the adsorbent bed contained within the vessel 236 is contacted by the second heated regeneration gas stream. The inlet gas stream is passed by way of conduit 232 into the header 234. From the header 234, the inlet gas stream passes by way of conduit 258 and valve 250 into the vessel 242. While passing through the adsorbent bed contained within the vessel 242, adsorbable components contained in the inlet gas stream are adsorbed on the bed. The residue gas stream produced exits the vessel 242 by way of conduit 266 and valve 276, and passes into the residue gas outlet header 268. From the header 268 the residue gas passes by way of conduit 271 into the ballast tank 269, and is withdrawn therefrom by way of conduit 275.

The first heated regeneration gas stream is passed from the header 296 into the vessel 240 by way of conduits 304 and 256, and valve 312. As will be understood, the adsorbent bed contained within the vessel 240 was subjected to extensive regeneration during the first four cycles so that a major portion of adsorbed difficult-to-regenerate components were desorbed therefrom. During the fifth cycle, the adsorbent bed contained within the vessel 240 is contacted with the first heated regeneration gas stream thereby completing the desorption of difficult-to-regenerate components therefrom. The first regeneration gas stream exits the vessel 240 by way of the conduits 264 and 342 and the valve 350, and passes into the combined regeneration gas stream outlet header 336. The second heated regeneration gas stream is passed from the header 316 into the adsorbent bed contained within the vessel 236 by way of conduits 320 and 252, and valve 328. The second regeneration gas stream exits the vessel 236 by way of conduits 260 and 338, and valve 346, and passes into the combined regeneration gas stream header 336. From the header 336, the combined regeneration gas stream and desorbed components are conducted to the gas cooler 356, the gas separator 360 wherein condensed components are removed therefrom, the gas booster 368, and the heating coil 290 of the heater 288 in the same manner as previously described.

The cooling gas stream is passed from the header 380 into the vessel 238 by way of conduits 384 and 254, and valve 392. The cooling gas stream exits the vessel 238 by way of conduits 262 and 402, and valve 410, and passes into the cooling gas stream outlet header 398. From the header 398, the cooling gas stream is circulated back to the inlet header 380 by way of the gas cooler 416 and gas booster 420 in the same manner as described above.

Thus, in operation of the system 230 as shown in Table II, each of the adsorbent beds contained within the vessels 236, 238, 240 and 242 is periodically subjected to extensive regeneration to remove difficult-to-regenerate components therefrom.

Figure 7:
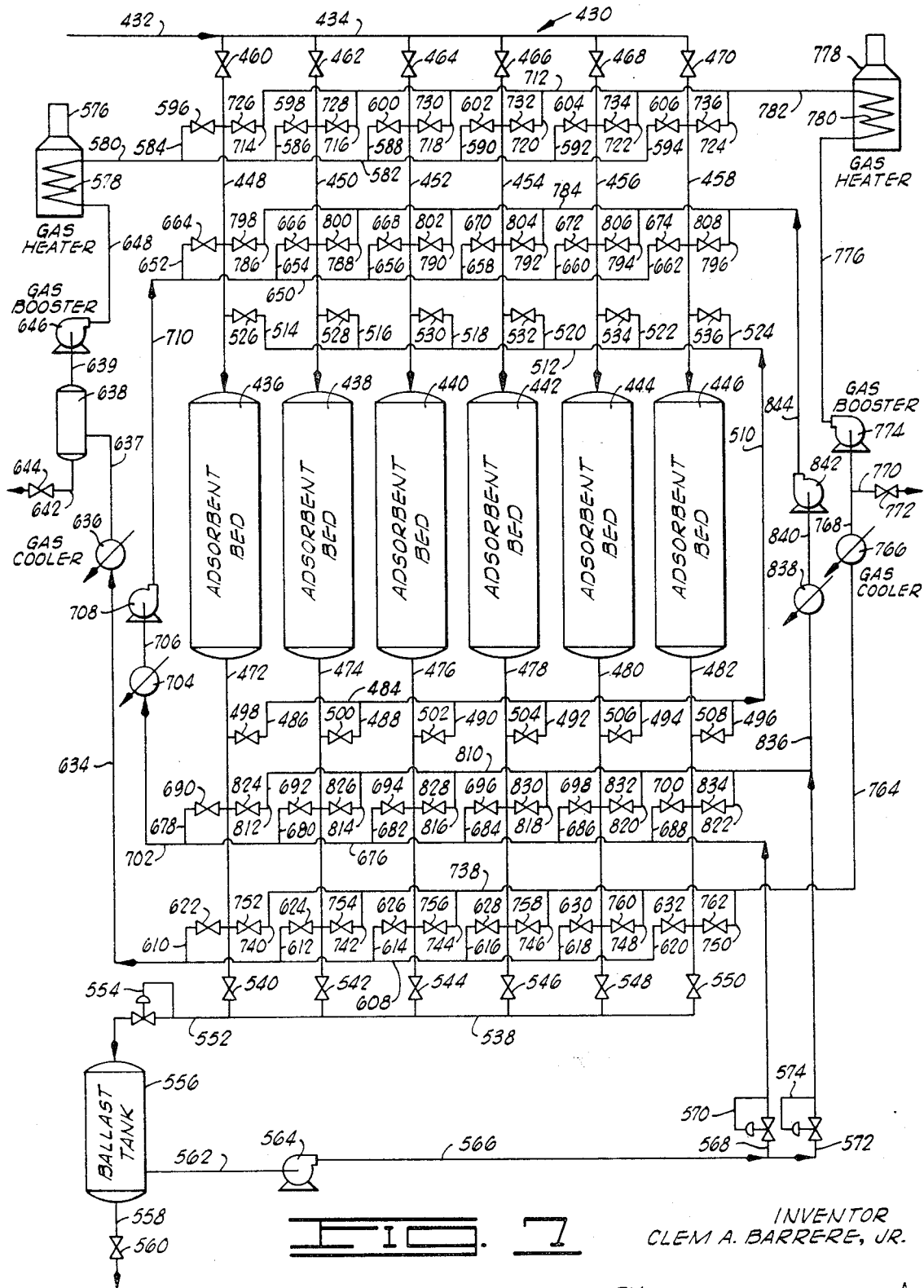
FIG. 7 illustrates yet another system which may be utilized for carrying out the process of the present invention in diagrammatic form.

Referring now to FIG. 7, an alternate system which may be used for carrying out the process of the present invention, generally designated by the numeral 430, is illustrated. The system 430 differs from the systems 10 and 230 previously described in that instead of four adsorbent beds, one of which is operated on a long cycle and the others on a short cycle, the system 430 includes six adsorbent beds three of which are operated on a long cycle and three of which are operated on a short cycle. The beds operated on the long cycle adsorb difficult-to-regenerate components from the inlet gas stream while the beds operated on the short cycle adsorb easy-to-regenerate components therefrom. The flow patterns of the various gas streams passing through the system 430 are switched so that all six beds are periodically subjected to extensive regeneration during the long cycle thereby preventing the buildup of difficult-to-regenerate components on the beds.

A multi-component inlet gas stream containing adsorbable components is conducted to the system 430 by way of an inlet conduit 432. From the conduit 432, the inlet gas stream passes into an inlet gas stream header 434 from where it is routed to one of six vessels 436, 438, 440, 442, 444 and 446, each containing a fixed bed of solid adsorbent. From the header 434 the inlet gas stream is conducted to one of the six vessels by way of conduits 448, 450, 452, 454, 456 and 458 which are connected to the header 434 and to inlet connections disposed in the vessels 436, 438, 440, 442, 444 and 446. Valves 460, 462, 464, 466, 468, and 470 are disposed in the conduits 448, 450, 452, 454, 456 and 458 respectively. Conduits 472, 474, 476, 478, 480 and 482 are connected to outlet connections in the vessels 436, 438, 440, 442, 444 and 446 respectively, and a residue gas outlet header 484 is provided connected to the conduits 472, 474, 476, 478, 480 and 484 by conduits 486, 488, 490, 492, 494 and 496. The residue gas outlet header 484 is connected by a conduit 510 to a residue gas inlet header 512. The residue gas inlet header 512 is connected to the conduits 448, 450, 452, 454, 456, and 458 by conduits 514, 516, 518, 520, 522 and 524 respectively. Valves 526, 528, 530, 532, 534, and 536 are disposed in the conduits 514, 516, 518, 520, 522 and 524 respectively. An effluent gas outlet header 538 is provided connected to the conduits 472, 474, 476, 478, 480 and 482. Valves 540, 542, 544, 546, 548, and 550 are disposed in the conduits 472, 474, 476, 478, 480 and 482 respectively. The effluent gas outlet header 538 is connected to a ballast tank 556 by a conduit 552. A conventional upstream pressure controller 554 is disposed in conduit 552, and the outlet connection of the ballast tank 556 is connected to a conduit 558 which has a conventional check valve 560 disposed therein. A conduit 562 is connected to the ballast tank and to a conventional gas booster 564. The discharge connection of the gas booster 564 is connected to a conduit 566. A pair of conduits 568 and 572 having conventional downstream pressure controllers 570 and 574 disposed therein respectively are connected to the conduit 566.

A first closed heated regeneration gas circuit is provided which includes a first heated regeneration gas stream inlet header 582 connected to the conduits 448, 450, 452, 454, 456 and 458 by conduits 584, 586, 588, 590, 592 and 594 respectively. Valves 596, 598, 600, 602, 604, and 606 are disposed in the conduits 584, 586, 588, 590, 592 and 594. A first regeneration gas stream outlet header 608 is provided connected to the conduits 472, 474, 476, 478, 480 and 482 by conduits 610, 612, 614, 616, 618 and 620 respectively. Valves 622, 624, 626, 628, 630 and 632 are disposed in the conduits 610, 612, 614, 616, 618 and 620. The header 608 is connected to a conventional gas stream cooler 636 by a conduit 634. The outlet of the gas cooler 636 is connected to a conventional gas-liquid separator 638 by a conduit 637. The liquid outlet of the separator 638 is connected to a conduit 642 having a conventional liquid level control valve 644 disposed therein. The gas outlet connection of the separator 638 is connected by a conduit 639 to a conventional gas booster 646, and the discharge connection of the gas booster 646 is connected by a conduit 648 to the heating coil 578 of the heater 576.

A first closed cooling gas stream circuit is provided which includes a first cooling gas stream inlet header 650 connected to the conduits 448, 450, 452, 454, 456 and 458 by conduits 652, 654, 656, 658, 660 and 662 respectively. Valves 664, 666, 668, 670, 672 and 674 are disposed in the conduits 652, 654, 656, 658, 660 and 662 respectively. A first cooling gas stream outlet header 676 is provided connected to the conduits 472, 474, 476, 478, 480 and 482 by conduits 678, 680, 682, 684, 686 and 688. Valves 690, 692, 694, 696, 698 and 700 are disposed in the conduits 678, 680, 682, 684, 686 and 688. The header 676 is connected by a conduit 702 to a conventional gas cooler 704. The outlet connection of the gas cooler 704 is connected by a conduit 706 to a gas booster 708 and the discharge connection of the gas booster 708 is connected by a conduit 710 to the first cooling gas stream inlet header 650.

A second closed regeneration gas stream circuit is provided which includes a second regeneration gas stream inlet header 712 connected to the conduits 448, 450, 452, 454, 456 and 458 by conduits 714, 716, 718, 720, 722 and 724 respectively. Valves 726, 728, 730, 732, 734 and 736 are disposed in the conduits 714, 716, 718, 720, 722 and 724. A second regeneration gas stream outlet header 738 is provided connected to the conduits 472, 474, 476, 478, 480 and 482 by conduits 740, 742, 744, 746, 748 and 750 respectively. Valves 752, 754, 756, 758, 760 and 762 are disposed in the conduits 740, 742, 744, 746, 748 and 750. The second regeneration gas stream outlet header 738 is connected by a conduit 764 to a conventional gas cooler 766. The outlet connection of the gas cooler 766 is connected by a conduit 768 to a gas booster 774. A conduit 770 having a valve 772 disposed therein is connected to the conduit 768 for withdrawing a portion of the second regeneration gas stream containing easy-to-regenerate components as will be described further hereinbelow. The discharge connection of the gas booster 774 is connected by a conduit 776 to the heating coil 780 of the gas heater 778.

A second closed cooling gas stream circuit is provided which includes a second cooling gas stream inlet header 784 connected to the conduits 448, 450, 452, 454, 456 and 458 by conduits 786, 788, 790, 792, 794, and 796, respectively. Valves 798, 800, 802, 804, 806, and 808 are disposed in the conduits 786, 788, 790, 792, 794 and 796. A second cooling gas stream outlet header 810 is provided connected to the conduits 472, 474, 476, 478, 480 and 482 by conduits 812, 814, 816, 818, 820 and 822 respectively. Valves 824, 826, 828, 830, 832 and 834 are disposed in the conduits 812, 814, 816, 818, 820 and 822. The second cooling gas stream outlet header 810 is connected by a conduit 836 to a gas cooler 838 which is in turn connected to a gas booster 842 by a conduit 840. The discharge connection of the gas booster 842 is connected by a conduit 844 to the second cooling gas stream inlet header 784.

The conduits 568 and 572 described previously are connected to the first and second cooling gas stream outlet headers 676 and 810 respectively.

OPERATION OF THE SYSTEM 430

By the present invention as carried out in the system 430, three of the adsorbent beds contained within the vessels 436, 438, 440, 442, 444 and 446 are operated on a long cycle, while the other three adsorbent beds are operated on a short cycle. Each bed is periodically subjected to extensive regeneration during the long cycle so that difficult-to-regenerate components are prevented from building up on the beds.

As will be understood, the flow patterns of the inlet gas stream, the first heated regeneration gas stream and the first cooling gas stream are changed at the beginning of each long cycle so that one of the beds adsorbs difficult-to-regenerate components from the inlet gas stream, one of the beds is contacted with the first heated regeneration gas stream so that difficult-to-regenerate components are desorbed therefrom and the other bed is contacted with the first cooling gas stream so that it is cooled preparatory to again contacting the inlet gas stream. The residue gas stream produced in the bed adsorbing difficult-to-regenerate components from the inlet gas stream is routed to one of the three beds operating on the short cycle, and the flow patterns of the residue gas stream, the second heated regeneration gas stream and the second cooling gas stream are changed at the beginning of each short cycle so that one of the beds adsorbs easy-to-regenerate components from the residue gas stream, another bed is contacted with the second heated regeneration gas stream so that easy-to-regenerate components are desorbed therefrom, while the third bed is contacted with the second cooling gas stream so that it is cooled preparatory to contacting the residue gas stream. In addition, at the beginning of each long cycle, the flow patterns of the gas streams are changed so that one of the beds previously operated in the long cycle is switched to the short cycle, and one of the beds previously operated on the short cycle is switched to the long cycle.

In order to present a clear understanding of the operation of the system 430, the adsorbent bed sequence for the system 430 is presented in Table III and the valve sequence is presented in Table IV below. Tables III AND IV are based on a long cycle time which is equal to four short cycle times.

TABLE III

ADSORBENT BED SEQUENCE FOR THE SYSTEM 430

| Short Cycle Number | Adsorbent Bed Number | | | | | |
|---|---|---|---|---|---|---|
| | 436 | 438 | 440 | 442 | 444 | 446 |
| 1  | Adsorbing[1] | Desorbing[1] | Cooling[1]    | Adsorbing[2]  | Desorbing[2]  | Cooling[2]    |
| 2  | Adsorbing[1] | Desorbing[1] | Cooling[1]    | Desorbing[2]  | Cooling[2]    | Adsorbing[2]  |
| 3  | Adsorbing[1] | Desorbing[1] | Cooling[1]    | Cooling[2]    | Adsorbing[2]  | Desorbing[2]  |
| 4  | Adsorbing[1] | Desorbing[1] | Cooling[1]    | Adsorbing[2]  | Desorbing[2]  | Cooling[2]    |
| 5  | Desorbing[1] | Cooling[1]   | Adsorbing[2]  | Desorbing[2]  | Cooling[2]    | Adsorbing[1]  |
| 6  | Desorbing[1] | Cooling[1]   | Desorbing[2]  | Cooling[2]    | Adsorbing[2]  | Adsorbing[1]  |
| 7  | Desorbing[1] | Cooling[1]   | Cooling[2]    | Adsorbing[2]  | Desorbing[2]  | Adsorbing[1]  |
| 8  | Desorbing[1] | Cooling[1]   | Adsorbing[2]  | Desorbing[2]  | Cooling[2]    | Adsorbing[1]  |
| 9  | Cooling[1]   | Adsorbing[2] | Desorbing[2]  | Cooling[2]    | Adsorbing[1]  | Desorbing[1]  |
| 10 | Cooling[1]   | Desorbing[2] | Cooling[2]    | Adsorbing[2]  | Adsorbing[1]  | Desorbing[1]  |
| 11 | Cooling[1]   | Cooling[2]   | Adsorbing[2]  | Desorbing[2]  | Adsorbing[1]  | Desorbing[1]  |
| 12 | Cooling[1]   | Adsorbing[2] | Desorbing[2]  | Cooling[2]    | Adsorbing[1]  | Desorbing[1]  |
| 13 | Adsorbing[2] | Desorbing[2] | Cooling[2]    | Adsorbing[1]  | Desorbing[1]  | Cooling[1]    |
| 14 | Desorbing[2] | Cooling[2]   | Adsorbing[1]  | Desorbing[1]  | Cooling[1]    | Adsorbing[2]  |
| 15 | Cooling[2]   | Adsorbing[2] | Desorbing[1]  | Adsorbing[1]  | Desorbing[1]  | Desorbing[2]  |
| 16 | Adsorbing[2] | Desorbing[2] | Cooling[2]    | Adsorbing[1]  | Desorbing[1]  | Cooling[1]    |
| 17 | Desorbing[2] | Cooling[2]   | Adsorbing[1]  | Desorbing[1]  | Cooling[1]    | Cooling[1]    |
| 18 | Cooling[2]   | Adsorbing[2] | Adsorbing[1]  | Desorbing[1]  | Cooling[1]    | Adsorbing[2]  |
| 19 | Adsorbing[2] | Desorbing[2] | Adsorbing[1]  | Desorbing[1]  | Cooling[1]    | Desorbing[2]  |
| 20 | Desorbing[2] | Cooling[2]   | Adsorbing[1]  | Desorbing[1]  | Cooling[1]    | Cooling[2]    |
| 21 | Cooling[2]   | Adsorbing[1] | Desorbing[1]  | Cooling[1]    | Adsorbing[2]  | Adsorbing[2]  |
| 22 | Adsorbing[2] | Adsorbing[1] | Desorbing[1]  | Cooling[1]    | Desorbing[2]  | Desorbing[2]  |
| 23 | Desorbing[2] | Adsorbing[1] | Desorbing[1]  | Cooling[1]    | Cooling[2]    | Cooling[2]    |
| 24 | Cooling[2]   | Adsorbing[1] | Desorbing[1]  | Cooling[1]    | Adsorbing[2]  | Desorbing[2]  |

[1] Operating in long cycle
[2] Operating in short cycle

TABLE IV

VALVE SEQUENCE FOR THE SYSTEM 430

| Short Cycle No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Inlet Gas | 460[1] | 460 | 460 | 460 | 470 | 470 | 470 | 470 | 468 | 468 | 468 | 468 | 466 | 466 | 466 | 466 | 464 | 464 | 464 | 464 | 462 | 462 | 462 | 462 |
| Residue Gas Outlet | 498 | 498 | 498 | 498 | 508 | 508 | 508 | 508 | 506 | 506 | 506 | 506 | 504 | 504 | 504 | 504 | 502 | 502 | 502 | 502 | 500 | 500 | 500 | 500 |
| Residue Gas Inlet | 532 | 536 | 534 | 532 | 530 | 534 | 532 | 530 | 528 | 532 | 530 | 528 | 526 | 530 | 528 | 526 | 536 | 528 | 526 | 536 | 534 | 526 | 536 | 534 |
| Effluent Gas Outlet | 546 | 550 | 548 | 546 | 544 | 548 | 546 | 544 | 542 | 546 | 544 | 542 | 540 | 544 | 542 | 540 | 550 | 542 | 540 | 550 | 548 | 540 | 550 | 548 |
| First Heated Regn Gas Stream Inlet | 598 | 598 | 598 | 598 | 596 | 596 | 596 | 596 | 606 | 606 | 606 | 606 | 604 | 604 | 604 | 604 | 602 | 602 | 602 | 602 | 600 | 600 | 600 | 600 |
| First Regn Gas Stream Outlet | 624 | 624 | 624 | 624 | 622 | 622 | 622 | 622 | 632 | 632 | 632 | 632 | 630 | 630 | 630 | 630 | 628 | 628 | 628 | 628 | 626 | 626 | 626 | 626 |
| First Cooling Gas Stream Inlet | 668 | 668 | 668 | 668 | 666 | 666 | 666 | 666 | 664 | 664 | 664 | 664 | 674 | 674 | 674 | 674 | 672 | 672 | 672 | 672 | 670 | 670 | 670 | 670 |
| First Cooling Gas Stream Outlet | 694 | 694 | 694 | 694 | 692 | 692 | 692 | 692 | 690 | 690 | 690 | 690 | 700 | 700 | 700 | 700 | 698 | 698 | 698 | 698 | 696 | 696 | 696 | 696 |
| Second Heated Regn Gas Stream Inlet | 734 | 732 | 736 | 734 | 732 | 730 | 734 | 732 | 730 | 728 | 732 | 730 | 728 | 726 | 730 | 728 | 726 | 736 | 728 | 726 | 736 | 734 | 726 | 736 |
| Second Regn Gas Stream Outlet | 760 | 758 | 762 | 760 | 758 | 756 | 760 | 758 | 756 | 754 | 758 | 756 | 754 | 752 | 756 | 754 | 752 | 762 | 754 | 752 | 762 | 760 | 752 | 762 |
| Second Cooling Gas Stream Inlet | 808 | 806 | 804 | 808 | 806 | 804 | 802 | 806 | 804 | 802 | 800 | 804 | 802 | 800 | 798 | 802 | 800 | 798 | 808 | 800 | 798 | 808 | 806 | 798 |
| Second Cooling Gas Stream Outlet | 834 | 832 | 830 | 834 | 832 | 830 | 828 | 832 | 830 | 828 | 826 | 830 | 828 | 826 | 824 | 828 | 826 | 824 | 834 | 826 | 824 | 834 | 832 | 824 |

[1] Numerals indicated are valves which are open during indicated short cycles - other valves closed.

Figure 8:
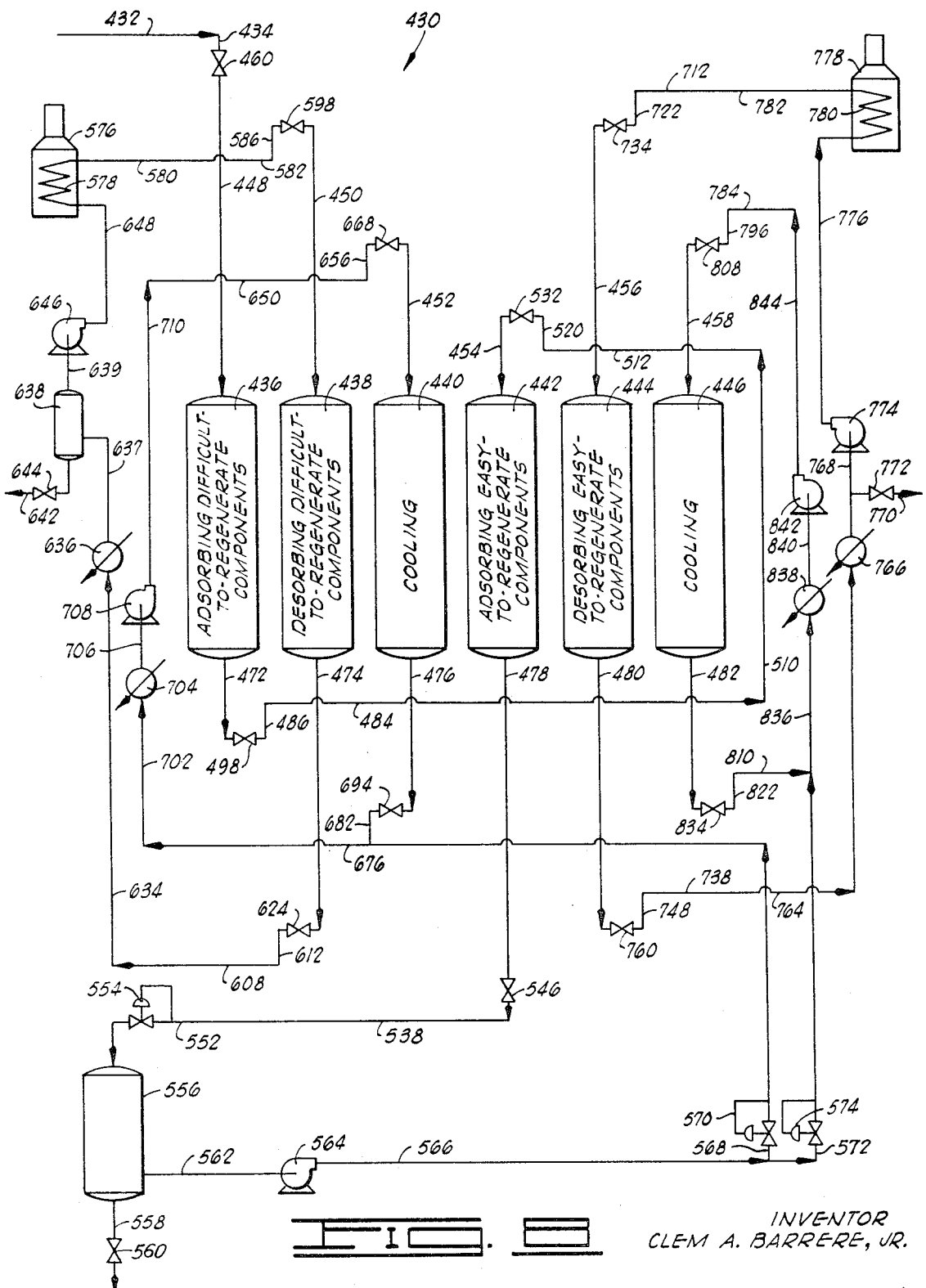
FIG. 8 illustrates the gas stream flow patterns through the system of FIG. 7 during a first cycle.

Referring now to FIG. 8, the flow patterns of the various gas streams passing through the system 430 are illustrated during a first short cycle. As shown in Table III, the adsorbent bed contained within the vessel 436 is contacting the inlet gas stream. The inlet gas stream is conducted to the system 430 by way of conduit 432 and is passed into the inlet gas header 434. From the header 434, the inlet gas stream passes by way of conduit 448 and valve 460 into the vessel 436. The conduits 450, 452, 454, 456 and 458, and valves 462, 464, 466, 468 and 470 serve similarly during subsequent cycles. As the inlet gas stream passes through the vessel 436 it contacts the adsorbent bed contained therein and difficult-to-regenerate components are adsorbed on the bed. A residue gas consisting primarily of easy-to-regenerate components is produced which exits the vessel 436 by way of conduit 472. From the conduit 472, the residue gas stream is conducted to the residue gas stream outlet header 484 by conduit 486 and valve 498. Conduits 488, 490, 492, 494 and 496, and valve 500, 502, 504, 506 and 508 serve similar purposes during subsequent cycles. From the header 484, the residue gas stream is conducted by way of conduit 510 to the residue gas inlet header 512. From the header 512 the residue gas stream passes by way of conduits 520 and 454, and valve 532, into the vessel 442. Conduits 514, 448, 516, 450, 518, 452, 522, 456, 524, and 458, and valves 526, 528, 530, 534 and 536 serve similarly during subsequent cycles. As the residue gas stream passes through the vessel 442 it contacts the adsorbent bed contained therein and easy-to-regenerate components are adsorbed on the bed, producing an effluent gas stream substantially free of adsorbable components. The effluent gas stream exits the vessel 442 by way of conduit 478 and valve 546, and passes into the effluent gas stream header 538. During subsequent cycles, the conduits 472, 474, 476, 480 and 482, and valves 540, 542, 544, 548 and 550 serve similarly. From the effluent gas outlet header 538, the effluent gas stream passes by way of conduit 552 into the ballast tank 556. From the ballast tank 556 the effluent gas stream is withdrawn from the system 430 by way of conduit 558. The ballast tank 556 and cooling gas stream make up gas apparatus connected thereto are operated in the same manner as described for the system 10. However, make up gas is supplied by the conduits 568 and 572 to the first and second cooling gas circuits in the system 430.

As shown in Table III, the adsorbent bed contained within the vessel 438 is contacted with the first heated regeneration gas stream and the adsorbent bed contained within the vessel 440 is contacted with the first cooling gas stream. Referring still to FIG. 8, the first heated regeneration gas stream passes from the header 582 into the vessel 438 by conduits 586 and 450, and valve 598. During subsequent cycles, conduits 584, 448, 588, 452, 590, 454, 592, 456, 594 and 458, and valves 596, 600, 602, 604, and 606 serve similarly. As the first heated regeneration gas stream passes through the vessel 438, it contacts the adsorbent bed contained therein thereby desorbing difficult-to-regenerate components therefrom. The regeneration gas stream and desorbed difficult-to-regenerate components exit the vessel 438 by way of conduits 474 and 612, and valve 624, and pass into the first regeneration gas stream outlet header 608. Conduits 472, 610, 476, 614, 478, 616, 480, 618, 482, and 620, and valves 622, 626, 628, 630 and 632 serve similarly. From the header 608 the first regeneration gas stream and desorbed components are conducted by way of conduit 634 to the gas cooler 636 wherein the desorbed components are condensed. From the gas cooler 636, the regeneration gas stream and condensed components pass into separator 638 wherein the condensed components are separated from the first regeneration gas stream and removed by way of conduit 642. The first regeneration gas stream exits the separator 638 by way of conduit 639 and passes into the gas booster 646. From the gas booster 646 the first regeneration gas stream is passed by way of conduit 648 through the heating coil 578 of the gas heater 576, wherein it is heated to a desired temperature level. From the heater 576, the first heated regeneration gas stream is circulated back to the header 582 by way of conduit 580.

The first cooling gas stream is conducted from the first cooling gas stream inlet header 650 to the vessel 440 by way of conduits 656 and 452, and valves 668. During subsequent cycles the conduits 652, 448, 654, 450, 658, 454, 660, 456, 662 and 458, and valves 664, 666, 670, 672 and 674 serve similarly. As the first cooling gas stream passes through the adsorbent bed contained within the vessel 440, it cools the adsorbent bed. The resultant heated cooling gas stream exits the vessel 440 by way of conduits 476 and 682, and valve 694, and passes into the first cooling gas stream outlet header 676. Conduits 472, 678, 474, 680, 478, 684, 480, 686, 482, and 688, and valves 690, 692, 696, 698 and 700 serve similarly during subsequent cycles. From the header 676 the cooling gas stream is conducted by way of conduit 702 to the gas cooler 704 wherein the cooling gas stream is cooled. From the cooler 704 the cooling gas stream is passed by way of conduit 706 to the gas booster 708, and from the gas booster 708, the cooling gas stream is circulated back to the first cooling gas stream inlet header 650 by way of conduit 710.

As described above and as shown i Table III, the adsorbent bed contained within the vessel 442 is contacted with the residue gas stream and easy-to-regenerate components are adsorbed therefrom. Simultaneously, the adsorbent bed contained within the vessel 444 is contacted with the second heated regeneration gas stream so that easy-to-regenerate components are desorbed therefrom, and the adsorbent bed contained within the vessel 446 is contacted with the second cooling gas stream so that the bed is cooled. The second heated regeneration gas stream passes from the second heated regeneration gas stream header 712 by way of conduit 722 and 456, and valve 734 into the vessel 444. During subsequent cycles, the conduits 448, 714, 450, 716, 452, 718, 454, 720, 458, and 724, and valves 726, 728, 730, 732, and 736 serve similarly. As the second heated regeneration gas stream passes through the vessel 444, it contacts the adsorbent bed contained therein thereby desorbing easy-to-regenerate components therefrom. The regeneration gas stream and easy-to-regenerate components exit the vessel 444 by way of conduits 480 and 748, and valve 760, and pass into the second regeneration gas stream outlet header 738. During subsequent cycles, the conduits 472, 740, 474, 742, 476, 744, 478, 746, 482 and 750, and valves 752, 754, 756, 758 and 762 serve similarly. From the header 738, the second regeneration gas stream and desorbed components pass by way of conduits 764 into gas cooler 766 wherein the regeneration gas stream and desorbed components are cooled. Assuming that the desorbed easy-to-regenerate components are of the non-condensible type, the cooled regeneration gas stream and components pass from the cooler 766 to the gas booster 774 by way of the conduit 768. A portion of the regeneration gas stream and easy-to-regenerate components are removed from the system 430 as a product stream by way of the conduit 770 and valve 772. From the gas booster 774, the second regeneration gas stream is circulated by way of conduit 776 to the heating coil 780 of the gas heater 778 wherein the second regeneration gas stream is heated to a desired temperature level. From the heater 778, the second heated regeneration gas stream passes back to the header 712 by way of conduit 782.

The second cooling gas stream is conducted from the second cooling gas stream inlet header 784 to the vessel 446 by way of conduit 796 and 458, and valve 808. The conduits 786, 448, 788, 450, 790, 452, 792, 454, 794 and 456, and the valves 798, 800, 802, 804 and 806 serve similarly during subsequent cycles. As the cooling gas stream passes through the vessel 446, it contacts the adsorbent bed contained therein causing the bed to be cooled. The heated cooling gas stream exits the vessel 446 by way of the conduits 482 and 822, and valve 834, and passes into the second cooling gas stream outlet header 810. During subsequent cycles, the conduits 472, 812, 474, 814, 476, 816, 478, 818, 480 and 820, and valves 824, 826, 828, 830, and 832 serve similarly. From the header 810, the second cooling gas stream is conducted by way of conduit 836 to the gas cooler 838 wherein the cooling gas stream is cooled. From the gas cooler 838, the cooling gas stream is conducted to the gas booster 842 by way of conduit 840, and from the gas booster 842, the cooling gas stream is circulated back to the second cooling gas stream inlet header 784 by way of the conduit 844. As shown in Table III, the adsorbent beds contained within the vessels 442, 444 and 446 are operated on a short cycle for the first four short cycles, while the adsorbent beds within the vessels 436, 438 and 440 are operated on the long cycle. During the fifth cycle, the flow patterns of the various gas streams are changed so that the bed cooled during the previous long cycle with the first cooling gas stream is contacted with the residue gas stream, and the bed cooled during the previous short cycle with the second cooling gas stream is contacted with the inlet gas stream.

The flow patterns of the various gas streams for the system 430 during the fifth short cycle are shown in FIG. 9. During the fifth short cycle, the adsorbent bed contained within the vessel 446, which was cooled by contact with the second cooling gas stream during the fourth cycle, is contacted with the inlet gas stream, and the adsorbent bed contained within the vessel 440, which was cooled by contact with the first cooling gas stream during the first four short cycles, is contacted with the residue gas stream. Thus, the adsorbent bed contained within the vessel 440 is switched into the short cycle operation, and the adsorbent bed contained within the vessel 446 is switched into the long cycle operation. The adsorbent beds contained within the vessels 436 and 438 are continued on the long cycle, and the adsorbent beds contained within the vessels 442 and 444 are continued on the short cycle. As shown in FIG. 9, the inlet gas stream is passed from the inlet gas stream header 434 into the vessel 446 by way of conduit 458 and valve 470. The residue gas stream produced in the vessel 446 exits the vessel by way of conduits 482 and 496, and valve 508, and passes into the residue gas outlet header 484. From the header 484, the residue gas stream is conducted by way of the conduit 510 to the residue gas inlet header 512. From the header 512, the residue gas stream is passed by way of conduits 518, and 452, and valve 530, into the vessel 440. The effluent gas exiting from the vessel 440 is conducted by the conduit 476 and valve 544 to the effluent gas outlet header 538. From the header 538, the effluent gas passes by way of conduit 552 into the ballast tank 556 from where the effluent gas is withdrawn by way of conduit 558. The first heated regeneration gas stream is conducted from the header 582 into the vessel 436 by way of conduits 584 and 448, and valve 596. The regeneration gas stream exits the vessel 436 by way of conduits 472 and 610, and valve 622, and passes into the first regeneration gas stream outlet header 608. From the header 608, the regeneration gas stream is passed through the gas cooler 636, the separator 638, the gas booster 646, and the gas heater 576 in the same manner as previously described. The first cooling gas stream is passed from the first cooling gas stream inlet header 650 by way of conduit 654 and 450, and valve 666, into the vessel 438. From the vessel 438, the cooling gas stream is conducted by the conduits 474 and 680 and the valve 692 into the first cooling gas stream outlet header 676. From the outlet header 676, the cooling gas stream is recirculated to the inlet header 650 in the same manner as described above. The second heated regeneration gas stream is passed from the second heated regeneration gas stream header 712 to the vessel 442 by way of conduits 720 and 454, and valve 732. From the vessel 442, the second regeneration gas stream is passed by way of conduits 478 and 746 and valve 758 into the second regeneration gas stream outlet header 738. From the header 738, the second regeneration gas stream is circulated back to the inlet header 712 in the same manner as described above. The second cooling gas stream passes from the header 784 into the vessel 444 by way of conduits 794 and 456, and valve 806. From the vessel 444, the cooling gas stream passes by way of conduits 480 and 820, and valve 832 into the second cooling gas stream outlet header 810. From the header 810, the cooling gas stream is recirculated to the inlet header 784 in the same manner as described above. As previously mentioned, make up gas is supplied to the first and second cooling gas stream outlet headers 676 and 810 by way of conduits 568 and 572 respectively. The source of the make up gas is the effluent gas contained within the ballast tank 556.

As will be understood by those skilled in the art, the various gas streams described above as containing or consisting or easy-to-regenerate components generally also contain some difficult-to-regenerate components, and vice versa. For example, if the inlet gas stream processed in the system 430 is natural gas containing both easy and difficult-to-regenerate components, a major portion of the difficult-to-regenerate components are removed from the inlet gas stream as it contacts the adsorbent beds operating on the long cycle. However, some difficult-to-regenerate components pass through the beds and are contained in the residue gas stream produced due to the equilibrium behavior of multicomponent gas streams. These difficult-to-regenerate components are adsorbed on the absorbent beds operating on the short cycle, and if not removed therefrom, build up on the beds. By the process of the present invention as carried out in the system 430, as well as the systems 10 and 230, each of the adsorbent beds utilized in the systems are periodically subjected to extensive regeneration. This insures the removal of difficult-to-regenerate components from each of the beds thereby preventing the buildup thereof and extending the effective life of the adsorbent material.

The particular system utilized for carrying out the process of the present invention depends upon the particular gas stream to be processed and various other factors. However, engineering techniques well known to those skilled in the art may be used to determine the most efficient and economical system for a particular application.

As is further understood by those skilled in the art, the various valves described above for the systems 10, 230 and 430 may be any of a variety of pneumatically, hydraulically or electrically operated control valves, either two-way or three-way, or combinations of check valves, as well as two-way or three-way valves may be used. The sequential opening and closing of the valves is automatically controlled by a cycle controller which may be any of a variety of conventional cycle controllers either time or temperature actuated. The cycle controller opens certain of the valves and closes others at the beginning of each cycle so that the flow patterns of the various gas streams passing through the systems are changes as described above and as shown in the various tables presented.

While the regeneration gas and cooling gas stream circuits described herein are of the closed type, it will be understood that other types of regeneration and cooling gas circuits known in the art as "open circuits" may be utilized wherein gas is continuously added or removed from the circuits. Further, apparatus may be provided (not shown) for compensating for temperature and volume changes in the regeneration gas and cooling gas circuits. In addition, provision may be made for purging adsorbable components remaining in the regenerated adsorbent beds at the end of each cycle, so that the adsorbable components are prevented from preloading the adsorbent beds or being lost with the effluent gas stream.

The difficult-to-regenerate components contained in the gas streams processed in adsorption systems of the type herein described are generally condensible at atmospheric temperatures, and may be removed from a regeneration gas stream by condensation and separation techniques. All or part of the easy-to-regenerate components may or may not be condensible, and if not condensible, the components may be removed by withdrawing a portion of the regeneration gas stream as described above. However, many various other methods for separating and recovering the difficult and easy-to-regenerate components from the various regeneration gas streams may be utilized which are well known to those skilled in the art.

The following examples will serve to further illustrate the process of the present invention.

EXAMPLE 1

A 20 mmscf/day natural gas stream of the composition given in Table V below, and at inlet conditions of 500 psia and 100°F is processed in the system 10. The difficult-to-regenerate components contained in the inlet gas stream are pentanes and heavier hydrocarbon compounds with the easy-to-regenerate components being butanes and lighter hydrocarbon compounds.

TABLE V

COMPOSITION OF THE INLET GAS STREAM

| Component | Concentration (Mol %) |
|---|---|
| Methane | 92.0 |
| Ethane | 5.0 |
| Propane | 2.0 |
| Isobutane | .5 |
| n-butane | .3 |
| Pentanes + | .2 |
| Total | 100.0 |

15,000 pounds of activated carbon adsorbent material are contained in each of the vessels 16, 18, 20 and 22. A short cycle time of 15 minutes and a long cycle time of 60 minutes are used.

During a first cycle, as shown in Table I and FIG. 2, the inlet gas stream contacts the adsorbent bed contained within the vessel 16 thereby causing pentanes and heavier hydrocarbon compounds to be adsorbed on the bed. A 19.9 mmscf/day residue gas stream of the composition given in Table VI below exits the vessel 610 at an average temperature of 100°F.

TABLE VI

COMPOSITION OF RESIDUE GAS STREAM

| Component | Concentration (Mol %) |
|---|---|
| Methane | 92.17 |
| Ethane | 5.01 |
| Propane | 2.01 |
| Isobutane | .50 |
| n-butane | .30 |
| Pentanes + | .01 |
| Total | 100.00 |

The residue gas stream is routed to the vessel 18 wherein it contacts the adsorbent bed contained therein. Butanes and lighter hydrocarbon compounds are adsorbed by the adsorbent bed contained within the vessel 18 and a 19.3 mmscf/day effluent gas stream of the composition given in Table VII is produced.

TABLE VII

COMPOSITION OF EFFLUENT GAS STREAM

| Component | Concentration (Mol %) |
|---|---|
| Methane | 94.82 |
| Ethane | 5.15 |
| Propane | .03 |
| Isobutane | NIL |
| n-butane | NIL |
| Pentanes + | NIL |
| Total | 100.00 |

The effluent gas stream exits the vessel 18 at an average temperature of 120°F, and passes into the ballast tank 96. The pressure controller 100 is set to control the back pressure on the system 10 at 480 psia, and during the cycle the pressure of the effluent gas stream contained within the ballast tank 96 reaches a minimum level of 450 psia.

The adsorbent bed contained within the vessel 20 is contacted with a 15 mmscf/day regeneration gas stream at an inlet temperature of 550°F. The regeneration gas stream exits the vessel 20 at an initial temperature of 120°F, reaching a maximum temperature of 475°F.

A 0.85 mmscf/day product stream is withdrawn from the system 10 by way of the conduit 177, which product stream is rich in butanes and lighter hydrocarbon compounds. The composition of the product stream is given in Table VIII below.

TABLE VIII

COMPOSITION OF VAPOR PRODUCT STREAM

| Component | Concentration (Mol %) |
|---|---|
| Methane | 23.2 |
| Ethane | 11.6 |
| Propane | 46.5 |
| Isobutane | 11.6 |
| n-butane | 6.9 |
| Pentanes + | 0.2 |
| Total | 100.0 |

A 25 mmscf/day stream of cooling gas is circulated through the adsorbent bed contained within the vessel 22 at an inlet temperature of 90°F. The cooling gas stream initially exiting the vessel 22 is at a temperature of 475°F, and reaches a minimum temperature of 100°F. The bed of adsorbent contained within the vessel 20 is cooled to an average temperature of 95°F.

Make-up gas is supplied to the cooling gas stream circuit from the ballast tank 96 in the amount of 0.3 mmscf/each short cycle.

As shown in Table I and FIG. 3, the adsorbent bed contained within the vessel 16 is subjected to an extensive regeneration during the fifth short cycle so that pentanes and heavier hydrocarbon compounds previously adsorbed thereon are removed therefrom. A 30 mmscf/day regeneration gas stream at an inlet temperature of 550°F is circulated through the bed during the fifth cycle. The regeneration gas stream is maintained at an inlet temperature of 550°F and exits the vessel 16 at an initial temperature of 110°F, reaching a maximum temperature of 525°F. The regeneration gas stream is cooled to a temperature of 100°F as it passes through the gas cooler 158, resulting in 600 gallons/day of condensed pentanes and heavier hydrocarbon compounds which are removed from the separator 164.

EXAMPLE 2

A 20 mmscf/day natural gas stream of the composition given in Table IX below, and at inlet conditions of 500 psia and 100°F is processed in the system 230 illustrated in FIG. 4. The difficult-to-regenerate components are pentanes and heavier hydrocarbon compounds and the easy-to-regenerate components are butanes and lighter hydrocarbon compounds.

TABLE IX

COMPOSITION OF INLET GAS STREAM

| Component | Concentration (Mol %) |
|---|---|
| Methane | 92.0 |
| Ethane | 5.0 |
| Propane | 2.0 |
| Isobutane | .5 |
| n-butane | .3 |
| Pentanes + | .2 |
| Total | 100.0 |

15,000 pounds of activated carbon adsorbent material are contained in each of the vessels 236, 238, 240, and 242. A short cycle time of 15 minutes and a long cycle time of 60 minutes are used.

During a first short cycle as shown in Table II and FIG. 5, the inlet gas stream contacts the adsorbent bed contained within the vessel 236 so that hydrocarbon compounds are adsorbed thereon, and a 19.3 mmscf/day residue gas stream is produced at an average temperature of 120°F which is withdrawn from the system 230.

The adsorbent bed contained within the vessel 238 is contacted with a 15 mmscf/day first heated regeneration gas stream. The first heated regeneration gas stream is at an inlet temperature of 120°F, reaching a maximum temperature of 475°F during the short cycle. The first regeneration gas stream causes butanes and lighter hydrocarbon components to be desorbed from the bed contained within the vessel 238.

The adsorbent bed contained within the vessel 240 is contacted with a 5 mmscf/day second heated regeneration gas stream at an inlet temperature of 550°F. The second regeneration gas stream exits the vessel 240 at an initial temperature of 475°F, reaching a maximum temperature of 525°F during the long cycle. The second heated regeneration gas stream causes pentanes and heavier hydrocarbon compounds to be desorbed from the bed contained within the vessel 240.

The first and second regeneration gas streams and desorbed components contained therein are combined and cooled to an average temperature of 100°F in the gas cooler 356, causing 5,000 gallons/day of hydrocarbon compounds to be condensed which are removed from the separator 360. The combined regeneration gas stream and uncondensed desorbed components exits the separator 360 at a rate of 20.4 mmscf/day, and is of the composition given in Table X below.

TABLE X

COMPOSITION OF COMBINED REGENERATION GAS STREAM EXITING THE SEPARATOR 360

| Component | Concentration (Mol %) |
|---|---|
| Methane | 21.5 |
| Ethane | 12.0 |
| Propane | 55.2 |
| Isobutane | 8.2 |
| n-butane | 3.0 |
| Pentanes + | 0.1 |
| Total | 100.0 |

A 0.4 mmscf/day product gas stream is withdrawn from the system 230 by way of the conduit 372. The 20 mmscf/day remaining combined regeneration gas stream is heated to a temperature of 550°F and divided into first and second heated regeneration gas streams which are recirculated through the vessels 238 and 240 respectively.

The adsorbent bed contained within the vessel 242 is contacted with a 25 mmscf/day cooling gas stream at an inlet temperature of 90°F. The cooling gas stream initially exiting the vessel 242 is at a temperature of 525°F, and reaches a minimum temperature of 100°F. The bed of adsorbent contained within the vessel 242 is cooled to an average temperature of 95°F.

EXAMPLE 3

A 20 mmscf/day natural gas stream of the composition given in Table XI below and at inlet conditions of 500 psia and 100°F is processed in the system 430 as shown in FIG. 7. The difficult-to-regenerate components are pentanes and heavier hydrocarbon compounds and the easy-to-regenerate components are butanes and lighter hydrocarbon compounds.

TABLE XI

COMPOSITION OF INLET GAS STREAM

| Component | Concentration (Mol %) |
|---|---|
| Methane | 92.0 |
| Ethane | 5.0 |
| Propane | 2.0 |
| Isobutane | .5 |
| n-butane | .3 |
| Pentanes + | .2 |
| | 100.0 |

15,000 pounds of activated carbon adsorbent material are contained in each of the vessels 436, 438, 440, 442, 444 and 446. A long cycle time of 45 minutes and a short cycle time of 15 minutes are used.

During a first cycle as shown in FIG. 8 and Tables III and IV, the inlet gas stream contacts the adsorbent bed contained within the vessel 436 so that pentanes and heavier compounds contained therein are adsorbed on the bed. A 19.9 mmscf/day residue gas stream is produced of the average composition given in Table XII below and at an average temperature of 100°F.

TABLE XII
COMPOSITION OF RESIDUE GAS STREAM

| Component | Concentration (Mol %) |
|---|---|
| Methane | 92.17 |
| Ethane | 5.01 |
| Propane | 2.01 |
| Isobutane | .50 |
| n-butane | .30 |
| Pentanes + | .01 |
| Total | 100.00 |

The residue gas stream is conducted to the vessel 442 and contacts the adsorbent bed contained therein causing butanes and lighter hydrocarbon compounds to be adsorbed on the bed. A 19.0 mmscf/day effluent gas stream of the average composition given in Table XIII is produced and is withdrawn from the system 430.

TABLE XIII
COMPOSITION OF EFFLUENT GAS STREAM

| Component | Concentration (Mol %) |
|---|---|
| Methane | 94.82 |
| Ethane | 5.15 |
| Propane | .03 |
| Isobutane | NIL |
| n-butane | NIL |
| Pentanes + | NIL |
| Total | 100.00 |

The adsorbent bed contained within the vessel 438 is contacted with a 8 mmscf/day first heated regeneration gas stream at an inlet temperature of 550°F so that previously adsorbed pentanes and heavier hydrocarbon compounds are desorbed therefrom. The first regeneration gas stream and desorbed components exiting from the vessel 438 reach a maximum temperature of 525°F during the long cycle, and are cooled to an average temperature of 100°F in the gas cooler 636, resulting in 600 gallons/day of pentanes and heavier hydrocarbon components being condensed and removed from the separator 638.

The adsorbent bed contained within the vessel 440 is contacted with a 8 mmscf/day first cooling gas stream at a temperature of 90°F. The cooling gas stream initially exiting the vessel 440 is at a temperature of 525°F and reaches a minimum temperature of 100°F during the long cycle. The bed of adsorbent contained within the vessel 440 is cooled to an average temperature of 95°F.

The adsorbent bed contained within the vessel 444 is contacted with a 15 mmscf/day second heated regeneration gas stream at an inlet temperature of 550°F causing butanes and lighter hydrocarbon compounds to be desorbed therefrom. The second regeneration gas stream and desorbed components exiting the vessel 444 reach a maximum temperature of 475°F during the short cycle, and are cooled to an average temperature of 100°F in the gas cooler 766. A 0.85 mmscf/day product stream containing butanes and lighter hydrocarbon compounds is withdrawn by way of the conduit 770 having the composition given in Table XIV below.

TABLE XIV
COMPOSITION OF VAPOR PRODUCT STREAM

| Component | Concentration (Mol %) |
|---|---|
| Methane | 23.2 |
| Ethane | 11.6 |
| Propane | 46.5 |
| Isobutane | 11.6 |
| n-butane | 6.9 |
| Pentanes + | 0.2 |
| Total | 100.0 |

The adsorbent bed contained within the vessel 446 is contacted with a 25 mmscf/day second cooling gas stream at an inlet temperature of 90°F. The cooling gas stream initially exiting the vessel 446 is at a temperature of 475°F, and reaches a minimum temperature of 100°F during the short cycle. The bed of adsorbent contained within the vessel 446 is cooled to an average temperature of 95°F.

A back pressure of 480 psia is held on the system 430 by the pressure controller 554, and 0.1 mmscf of effluent gas is made up to the first cooling gas stream circuit during the long cycle. 0.3 mmscf/day of effluent gas is made up to the second cooling gas stream circuit during the short cycle. The pressure level of the ballast tank reaches a minimum of 440 psia during each short cycle.

The present invention, therefore, is well adapted to carry out the objects and attain the ends and advantages mentioned as well as those inherent therein. While three systems for carrying out the process of the present invention have been described for purposes of disclosure, numerous other systems may be utilized which will readily suggest themselves to those skilled in the art and which are encompassed within the spirit of the invention disclosed and claimed herein.

What is claimed is:

1. An absorption process for recovering both easy-to-regenerate and difficult-to-regenerate adsorbable components from a multi-component inlet gas stream which comprises the steps of:
   a. contacting at least one of a plurality of beds of solid adsorbent with said inlet gas stream so that both easy-to-regenerate and difficult-to-regenerate adsorbable components contained therein are adsorbed on said bed or beds;
   b. simultaneously contacting at least one other of said beds with a heated regeneration gas stream so that previously adsorbed components which are easy-to-regenerate are desorbed therefrom into said regeneration gas stream;
   c. recovering said easy-to-regenerate components from said regeneration gas stream;
   d. simultaneously contacting at least one other of said beds with a cooling gas stream so that said bed or beds are cooled preparatory to contacting said inlet gas stream;
   e. continuously changing the flow patterns of said inlet gas stream, regeneration gas stream and cooling gas stream so that the bed or beds just contacted with said inlet gas stream are contacted with said heated regeneration gas stream thereby desorbing easy-to-regenerate components therefrom, the bed or beds just contacted with said cooling gas stream are contacted with said inlet gas stream so that adsorbable components are adsorbed by said bed or beds, and the bed or beds just contacted with said heated regeneration gas stream are contacted with said cooling gas stream so that said beds are cooled;

f. periodically contacting each of said beds with a second heated regeneration gas stream for a period of time at least four times as long as the period of contact of the first heated regeneration gas stream in step (b), to raise the maximum temperature of the effluent from the regenerating adsorber to a temperature at least 50°F higher than the temperature of the effluent from the regenerating adsorber in step (b), so that previously adsorbed components which are difficult-to-regenerate are desorbed therefrom into said second regeneration gas stream thereby preventing the build-up of difficult-to-regenerate components on said beds; and g. recovering said difficult-to-regenerate components from said second regeneration gas stream.

2. The process of claim 1 wherein step (g) comprises the steps of:
cooling said regeneration gas stream so that difficult-to-regenerate components contained therein are condensed;
separating the condensed difficult-to-regenerate components from the remaining regeneration gas stream; and
withdrawing the condensed difficult-to-regenerate components from said process.

3. The process of claim 2 wherein step (c) comprises:
cooling said regeneration gas stream so that easy-to-regenerate components contained therein are condensed;
separating the condensed easy-to-regenerate components from the remaining regeneration gas stream; and
withdrawing the condensed easy-to-regenerate components from said process.

4. The process of claim 2 wherein the multi-component inlet gas stream is a natural gas stream, the difficult-to-regenerate components contained therein are pentanes and heavier hydrocarbon compounds, and the easy-to-regenerate components contained therein are butanes and lighter hydrocarbon compounds.

5. The process of claim 2 wherein the multi-component inlet gas stream is a refinery gas stream, the difficult-to-regenerate components contained therein are heavy olefin hydrocarbon compounds and the easy-to-regenerate components components contained therein are ethylene, ethane and other light hydrocarbon compounds.

6. An adsorption process for recovering adsorbable components from a multi-component inlet gas stream comprising the steps of:

a. contacting one of a plurality of solid adsorbent beds with said inlet gas stream so that adsorbable components which are difficult to regenerate contained therein are adsorbed on said bed and a residue gas stream consisting primarily of adsorbable components which are easy-to-regenerate is produced;

b. contacting another of said beds with the residue gas stream produced in step (a) so that easy-to-regenerate components contained therein are adsorbed on said bed and an effluent gas stream substantially free of adsorbable components is produced;

c. contacting yet another of said beds with a first heated regeneration gas stream so that easy-to-regenerate components previously adsorbed thereon are desorbed into said regeneration gas stream;

d. recovering said easy-to-regenerate components from said first regeneration gas stream;

e. contacting still another of said beds with a cooling gas stream so that said bed is cooled;

f. continuously changing the flow patterns of said residue gas stream, said first heated regeneration gas stream and said cooling gas stream so that the bed just contacted with said residue gas stream is contacted with said heated regeneration gas stream thereby desorbing easy-to-regenerate components therefrom, the bed just contacted with said cooling gas stream is contacted with said residue gas stream so that easy-to-regenerate components are adsorbed thereon, and the bed just contacted with said first heated regeneration gas stream is contacted with said cooling gas stream preparatory to again being contacted with said residue gas stream;

g. periodically changing the flow pattern of said inlet gas stream so that when the bed contacted therewith becomes loaded with difficult-to-regenerate components, the bed just contacted with said residue gas stream is contacted with said inlet gas stream thereby causing difficult-to-regenerate components to be adsorbed thereon;

h. contacting the bed just contacted with said inlet gas stream with a second heated regeneration gas stream during the cycle following step (g) so that the difficult-to-regenerate components adsorbed thereon are desorbed into said second regeneration gas stream;

i. recovering the desorbed difficult-to-regenerate components from second regeneration gas stream; and j. repeating steps (f) through (i).

7. The process of claim 6 wherein step (a) comprises the steps of:
cooling said regeneration gas stream so that difficult-to-regenerate components contained therein are condensed;
separating the condensed components from the remaining regeneration gas stream; and
withdrawing the condensed difficult-to-regenerate components from said process.

8. The process of claim 7 wherein the multi-component inlet gas stream is a natural gas stream, the difficult-to-regenerate components contained therein are pentanes and heavier hydrocarbon compounds, and the easy-to-regenerate components contained therein are butanes and lighter hydrocarbon compounds.

9. The process of claim 7 wherein the multi-component inlet gas stream is a refinery gas stream, the difficult-to-regenerate components contained therein are heavy olefin hydrocarbon compounds and the easy-to-regenerate components contained therein are ethylene, ethane and other light hydrocarbon compounds.

10. The process of claim 7 which is further characterized to include the steps of:
passing said produced effluent gas stream into a ballast tank during each cycle when the pressure of said effluent gas stream exceeds a predetermined level;
providing make-up gas to said cooling gas stream during each cycle from the effluent gas contained within said ballast tank when the pressure of said cooling gas stream reaches a predetermined minimum level; and withdrawing effluent gas from said ballast tank when the pressure of said effluent gas contained therein exceeds a predetermined level.

11. An adsorption process for recovering both easy-to-regenerate and difficult-to-regenerate adsorbable components from a multi-component inlet gas stream comprising the steps of:

a. contacting one of a plurality of solid adsorbent beds with said inlet gas stream so that both easy-to-regenerate and difficult-to-regenerate adsorbable components contained therein are adsorbed on said bed and a residue gas stream substantially free of such adsorbable components is produced;

b. contacting another of said beds with a first heated regeneration gas stream so that previously adsorbed components which are easy-to-regenerate are desorbed into said first regeneration gas stream;

c. contacting yet another of said beds with a second heated regeneration gas stream for a period of time at least four times as long as the period of contact of the first heated regeneration gas stream in step (b), to raise the maximum temperature of the effluent from the regenerating adsorber to a temperature at least 50°F higher than the temperature of the effluent from the regenerating adsorber in step (b), so that previously adsorbed components which are difficult-to-regenerate are desorbed into said second regeneration gas stream;

d. recovering said easy- and difficult-to-regenerate components from said first and second regeneration gas streams;

e. contacting still another of said beds with a cooling gas stream so that said bed is cooled;

f. continuously cycling the flow patterns of said inlet gas stream, said first heated regeneration gas stream and said cooling gas stream so that the bed just contacted with said inlet gas stream is contacted with said first heated regeneration gas stream thereby desorbing easy-to-regenerate components therefrom, the bed just contacted with said cooling gas stream is contacted with said inlet gas stream so that adsorbable components are adsorbed thereon and the bed just contacted with said first heated regeneration gas stream is contacted with said cooling gas stream preparatory to being contacted with said inlet gas stream;

g. periodically changing the flow pattern of said second heated regeneration gas stream so that when a bed being contacted with said inlet gas stream reaches a predetermined difficult-to-regenerate component content, it is contacted with said second heated regeneration gas stream and the bed just contacted with said second heated regeneration gas stream is contacted with said first heated regeneration gas stream; and h. repeating steps (f) and (g).

12. The process of claim 11 wherein step (d) comprises the steps of:

combining said first and second regeneration gas streams containing easy and difficult-to-regenerate components respectively;

cooling the combined regeneration gas stream so that the easy and difficult-to-regenerate components contained therein are condensed;

separating the condensed components from the remaining combined regeneration gas stream;

withdrawing the condensed components from said process;

heating said combined regeneration gas stream; and dividing said combined heated regeneration gas stream into said first and second heated regeneration gas streams.

13. The process of claim 11 wherein the multi-component inlet gas stream is a natural gas stream, the difficult-to-regenerate components contained therein are pentanes and heavier hydrocarbon compounds, and the easy-to-regenerate components contained therein are butanes and lighter hydrocarbon compounds.

14. The process of claim 11 wherein the multi-component inlet gas stream is a refinery gas stream, the difficult-to-regenerate components contained therein are heavy olefin hydrocarbon compounds and the easy-to-regenerate components contained therein are ethylene, ethane, and other light hydrocarbon compounds.

15. The process of claim 6 which is further characterized to include the steps of:

passing said residue gas stream substantially free of adsorbable components into a ballast tank during each cycle when the pressure of said residue gas stream exceeds a predetermined level;

providing make-up gas to said cooling gas stream during each cycle from the residue gas contained within the said ballast tank when the pressure of said cooling gas stream reaches a predetermined minimum level; and withdrawing residue gas from said ballast tank when the pressure of said residue gas contained therein exceeds a predetermined level.

16. A cyclic adsorption process for recovering adsorbable components from a multi-component inlet gas stream which comprises the steps of:

a. contacting one of a plurality of solid adsorbent beds with said inlet gas stream so that adsorbable components contained therein which are difficult to regenerate are adsorbed on said bed and a residue gas stream consisting primarily of components which are easy to regenerate is produced;

b. contacting another of said beds with a first heated regeneration gas stream so that difficult-to-regenerate components previously adsorbed thereon are desorbed into said first regeneration gas stream;

c. recovering said difficult-to-regenerate components from said first regeneration gas stream;

d. contacting yet another of said beds with a first cooling gas stream so that said bed is cooled preparatory to contacting said inlet gas stream;

e. continuously cycling the flow patterns of said inlet gas stream, said first heated regeneration gas stream and said first cooling gas stream on a long cycle so that the bed just contacted with said inlet gas stream is contacted with said first heated regeneration gas stream thereby desorbing difficult-to-regenerate components therefrom, the bed just contacted with said first cooling gas stream is contacted with said inlet gas stream so that difficult-to-regenerate components are adsorbed thereon and the bed just contacted with said first heated regeneration gas stream is contacted with said cooling gas stream;

f. contacting still another of said beds with the residue gas stream produced in step (a) so that easy-to-regenerate components and remaining difficult-to-regenerate components contained therein are adsorbed on said bed and an effluent gas stream substantially free of adsorbable components is produced;

g. contacting still another of said beds with a second heated regeneration gas stream so that easy-to-regenerate components previously adsorbed thereon are desorbed into said second regeneration gas stream;

h. recovering said easy-to-regenerate components from said second regeneration gas stream;

i. contacting still another of said beds with a second cooling gas stream so that said bed is cooled preparatory to contacting said residue gas stream;

j. continuously cycling the flow patterns of said residue gas stream, said second heated regeneration gas stream and said second cooling gas stream on a short cycle so that the bed just contacted with said residue gas stream is contacted with said second heated regeneration gas stream thereby desorbing easy-to-regenerate components therefrom, the bed just contacted with said second cooling gas stream is contacted with said residue gas stream so that easy-to-regenerate components and remaining difficult-to-regenerate components contained therein are adsorbed thereon and the bed just contacted with said second heated regeneration gas stream is contacted with said second cooling gas stream; and k. changing the flow patterns of said inlet gas stream and said residue gas stream at the beginning of each long cycle so that the bed just contacted with said second cooling gas stream is contacted with said inlet gas stream and the bed just contacted with said first cooling gas stream is contacted with said residue gas stream thereby subjecting each of said beds to regeneration on said long cycle so that adsorbed difficult-to-regenerate components are removed therefrom.

17. The process of claim 11 wherein step (c) comprises the steps of:
cooling said first regeneration gas stream so that difficult-to-regenerate components contained therein are condensed;
separating the condensed components from the remaining first regeneration gas stream; and
withdrawing the condensed difficult-to-regenerate components from said process.

18. The process of claim 17 wherein step (h) comprises the steps of:
cooling said second regeneration gas stream so that easy-to-regenerate components contained therein are condensed;
separating the condensed components from the remaining second regeneration gas stream; and
withdrawing the condensed easy-to-regenerate components from said process.

19. The process of claim 17 wherein the multi-component inlet gas stream is a natural gas stream, the difficult-to-regenerate components contained therein are pentanes and heavier hydrocarbon compounds, and the easy-to-regenerate components contained therein are butanes and lighter hydrocarbon compounds.

20. The process of claim 17 wherein the multi-component inlet gas stream is a refinery gas stream, the difficult-to-regenerate components contained therein are heavy olefin hydrocarbon compounds and the easy-to-regenerate components contained therein are ethylene, ethane and other light hydrocarbon compounds.

21. The process of claim 17 which is further characterized to include the step of:
passing said produced effluent gas stream into a ballast tank during each cycle when the pressure of said effluent gas stream exceeds a predetermined level;
providing make-up gas to said cooling gas stream during each cycle from the effluent gas contained within said ballast tank when the pressure of said cooling gas stream reaches a predetermined minimum level; and
withdrawing effluent gas from said ballast tank when the pressure of said effluent gas contained therein exceeds a predetermined level.

* * * * *